United States Patent [19]

van der Lely

[11] 4,240,514
[45] Dec. 23, 1980

[54] OVERLOAD COUPLINGS

[76] Inventor: Cornelis van der Lely, 7, Brüschenrain, Zug, Switzerland

[21] Appl. No.: 875,948

[22] Filed: Feb. 7, 1978

[30] Foreign Application Priority Data

Feb. 11, 1977 [NL] Netherlands .......................... 7701445

[51] Int. Cl.³ ....................... B60K 25/06; F16D 11/00
[52] U.S. Cl. ................................ 180/53 D; 192/56 F; 192/71
[58] Field of Search .............. 180/53 R, 53 A, 53 FE, 180/53 C, 54 R, 53 D; 74/789, 777, 770; 192/56 R, 56 F, 30 W, 71; 64/29

[56] References Cited

U.S. PATENT DOCUMENTS

| | | | |
|---|---|---|---|
| 3,419,117 | 12/1968 | Conway | 192/56 F |
| 3,664,474 | 5/1972 | Blake | 192/56 F |
| 3,693,770 | 9/1972 | Charchian | 192/30 W |
| 3,698,249 | 10/1972 | Weaver | 73/398 R |
| 3,807,539 | 4/1974 | Reed | 192/56 F |
| 4,089,396 | 5/1978 | Quick | 192/56 F |

Primary Examiner—John J. Love
Assistant Examiner—Randall A. Schrecengost
Attorney, Agent, or Firm—William B. Mason

[57] ABSTRACT

A tractor driving system has an overload coupling in which a hydraulic system disconnects a driven output shaft upon overload. Also, the system includes a gauge which is visible to the driver station as well as adjusting features that enable the transmitted torque to be preselected and monitored. In one aspect, fluid in the ducts, chambers, etc., which normally form a constant volume space, holds a plunger in a recess between two coupling parts. Upon overload, the plunger end is forced out of the recess and hydraulic fluid is displaced through a relief valve until fluid returns the plunger, either by opening the circuit to a pump, or by spring biasing a piston in the system with a set screw. In the meanwhile, one part can rotate with respect to the other part. In another aspect, two sets of gears can be alternatively used to drive the output shaft at different speeds. The gear sets can be operated by a double acting plunger having two bevelled ends. One end engages a recess of one gear set and the other end, a recess in a second set, when the plunger is selectively moved to operate either set. Upon overload, the plunger is displaced to a neutral position in which no output drive takes place. A switching block in communication with a pump and reservoir can establish communication with fluid pressure and a spring biased valve used to establish the limit of torque being transmitted. The signalling device can house the set screw that controls the pressure within the system.

13 Claims, 28 Drawing Figures

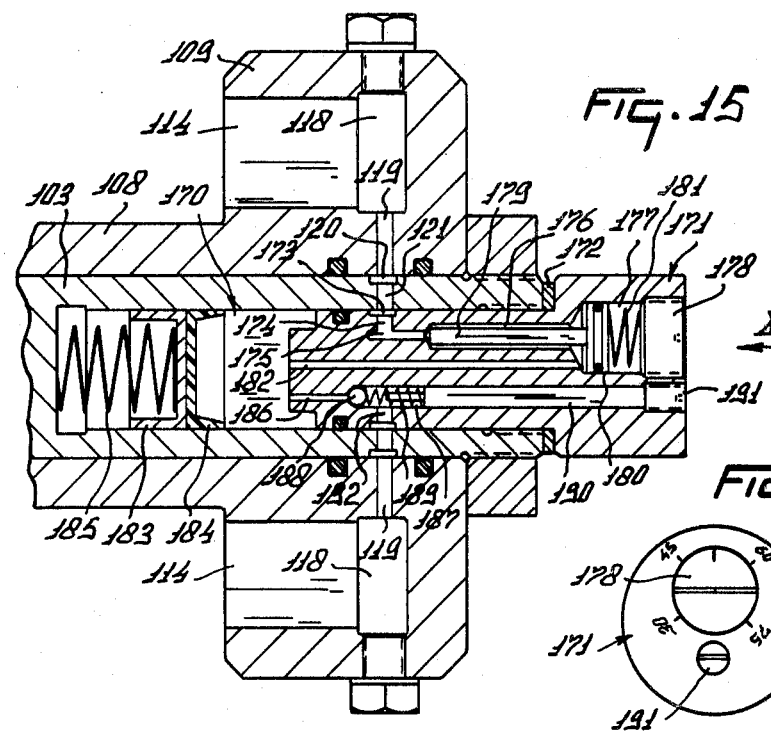
FIG. 15
FIG. 16
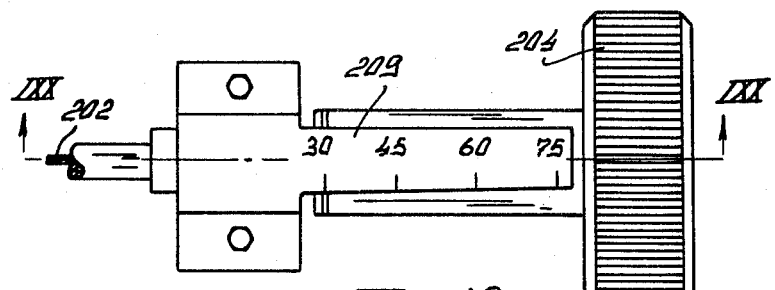
FIG. 18
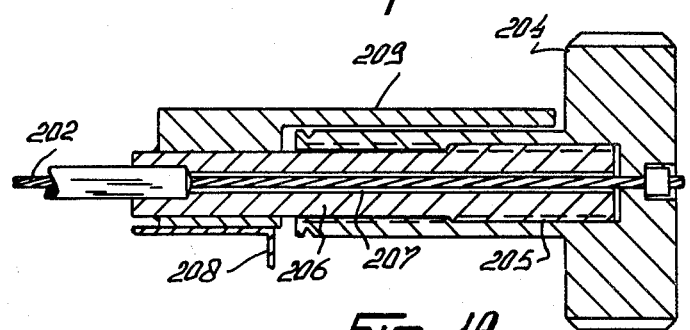
FIG. 19

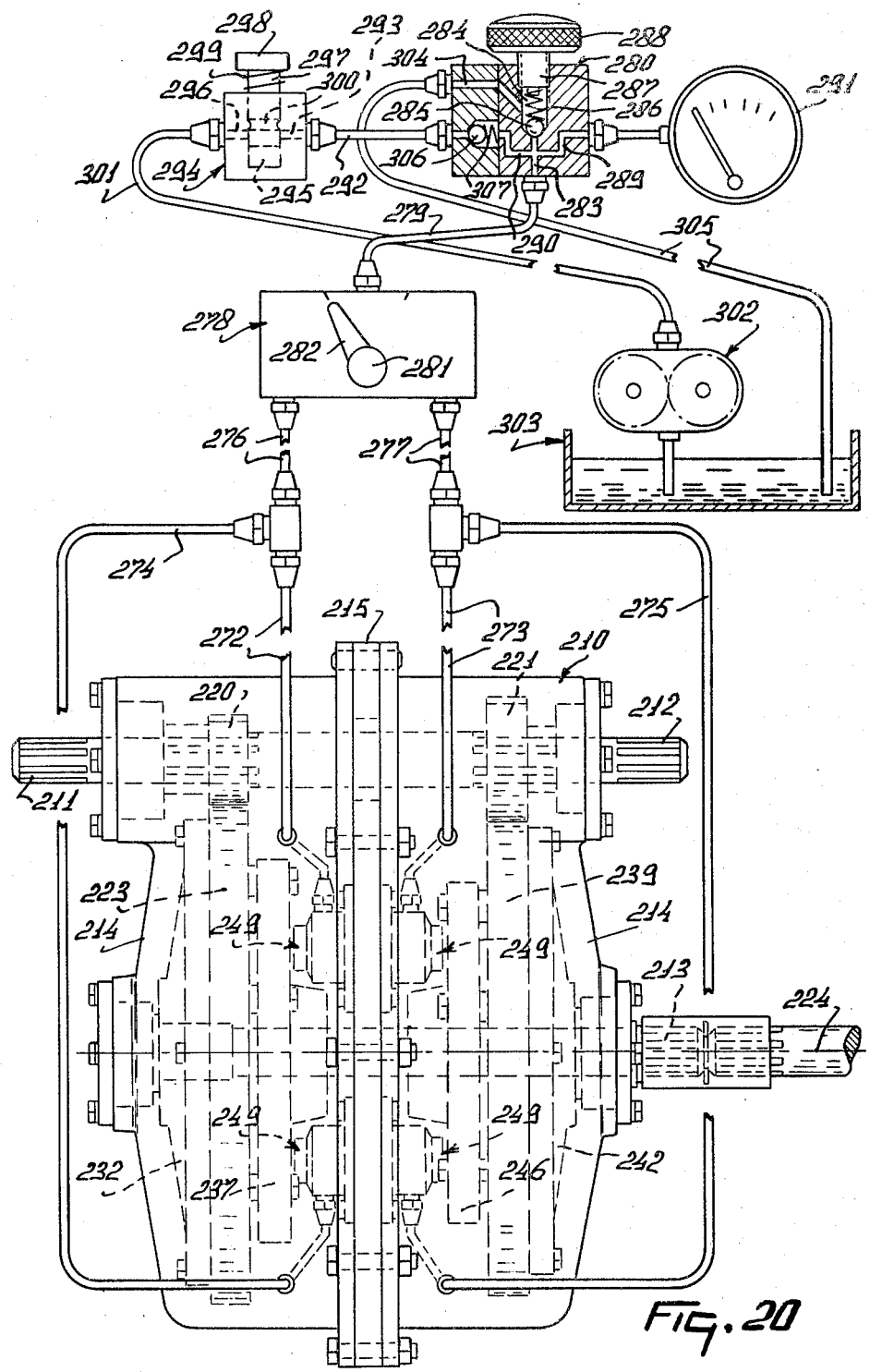

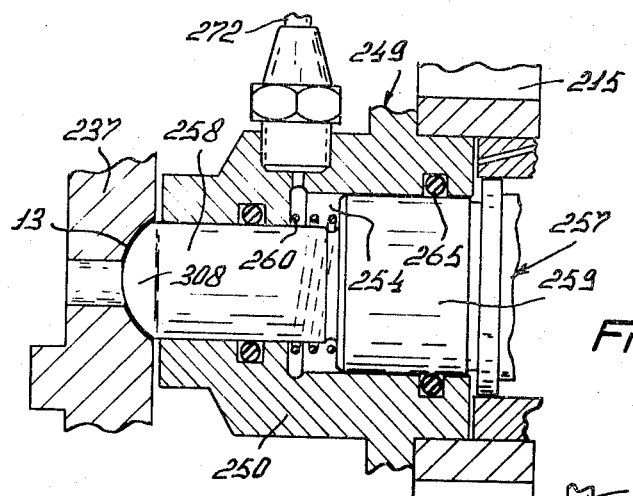
FIG. 25
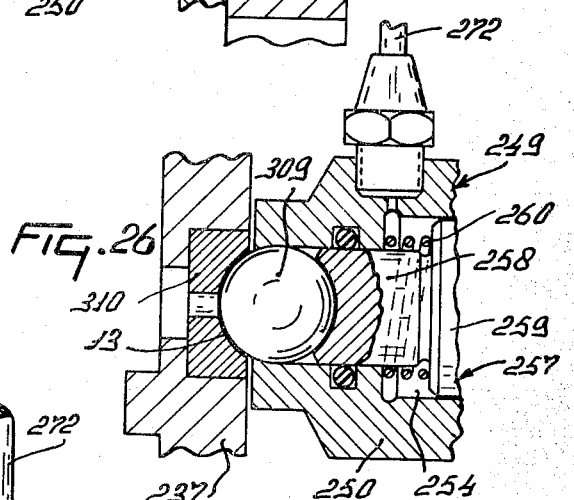
FIG. 26
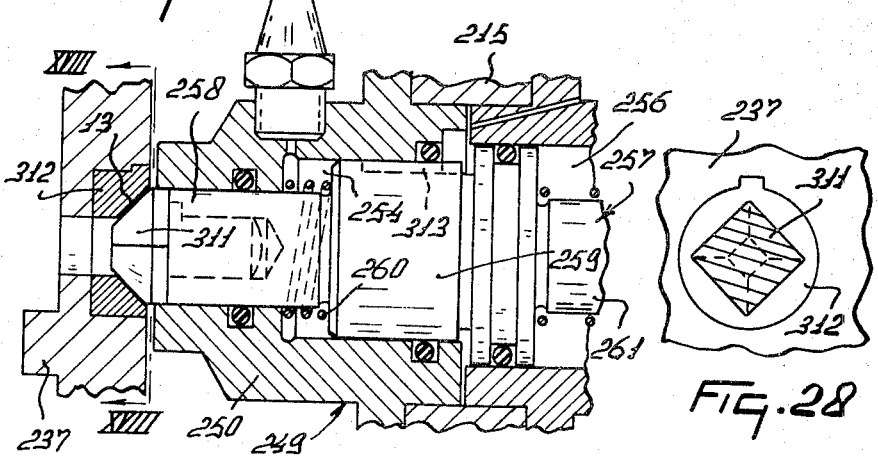
FIG. 27
FIG. 28

OVERLOAD COUPLINGS

According to the present invention there is provided a tractor including a driven shaft which has an overload coupling, the coupling being connected to a signalling device for indicating the occurrence of overload, which is disposed in such a position as to be discernible from the driver's seat.

For a better understanding of the invention and to show how it may be carried into effect, reference will now be made, by way of example only, to the accompanying drawings, in which:

FIG. 12 is a sectional view taken on the lines XII—XII in FIG. 10;

FIG. 15 shows a fifth embodiment of coupling;

FIG. 16 is an elevational view taken in the direction of the arrow XVI in FIG. 15;

FIG. 18 is an elevational view of a setting member of the construction shown in FIG. 17;

FIG. 19 is a sectional view taken on the lines XIX—XIX in FIG. 18.

FIG. 20 is partly an elevational view and partly a sectional view of a sixth embodiment of coupling;

FIG. 25 is a sectional view of an alternative construction suitable for use in all preceding embodiments;

FIG. 26 shows an alternative construction suitable for use in all preceding embodiments;

FIG. 27 is a sectional view of an alternative construction suitable for use in all preceding embodiments;

FIG. 28 is a sectional view taken on the lines XXVIII—XXVIII in FIG. 27.

Figure 1:
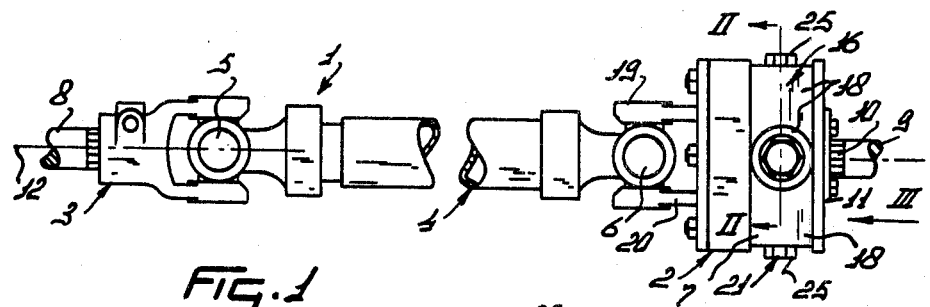
FIG. 1 is an elevational view of an intermediate shaft including an overload coupling.

A coupling embodying the present invention will now be described in conjunction with an intermediate shaft assembly 1 illustrated in FIG. 1, which can be considered to be arranged between a power plant (for example, a tractor, a motor vehicle or a driving engine) and an implement to be driven, for example, in the case of a tractor, a soil cultivating machine, which may occupy, in operation, various positions relative to the tractor and which may be wholly or partly obstructed in operation by stones or other objects which then prevent the rotation of a driven tool of the implement. The intermediate shaft assembly 1 is constructed as a shaft 4 having an end portion 2 for coupling with the implement to be driven, and an end portion 3 for coupling with the power plant. The end portions 2 and 3 are connected to the shaft 4 by two universal couplings 5 and 6. The coupling according to the invention, which is designed to limit the power transmitted to the implement to be driven, for example when the operation of the implement is obstructed, is arranged in a housing 7 included in the end portion 2 coupled with the implement.

Although this description will refer to use of the coupling in an intermediate shaft assembly, it should be emphasized that the coupling according to the invention may be employed in any situation where the effects of possible overload of a driven tool or implement are to be avoided.

Referring to FIG. 1, a shaft coupled with the power plant is designated by reference numeral 8. Where it joins the end portion 3 of the intermediate shaft assembly 1, this shaft 8 has on its outer surface axially extending splines co-operating with internal splines in the end portion 3. An input shaft 9 of the implement to be driven also has splines 10 on its outer surface and its end nearer the intermediate shaft assembly 1. This splined end is inserted into the housing 7 of the end portion 2. From the sectional view of FIG. 2 it will be apparent that the splines 10 of the shaft 9 fit into corresponding internal splines in a coupling element 11 which is part of the end portion 2. The coupling element 11 has a substantially cylindrical outer surface and is coaxial with the center line 12, which coincides with the center line of the input shaft 9 of the implement. A cavity is provided in the coupling element 11; the internal splines which engage the splines 10 are formed in the wall of this cavity. The cavity is symmetrical about the center line 12. The coupling element 11 may be made of comparatively hard material. In the embodiment shown in FIG. 2, the coupling element 11 has four conical recesses 13. The four center lines of these conical recesses are located in a common plane which is perpendicular to the center line 12; also, the center lines intersect one another at the center lines 12 and are at an angle of 90° to one another so that the recesses 13 are located in twos, diametrically opposite one another. The tips of the conical recesses 13 are located inside the coupling element 11, the conical surfaces flaring outwardly. The regions of the apices of the geometrical conical surfaces are not present in the material of the coupling element 11, since the recesses 13 meet bores 14 and 15, which are provided only for production reasons. The conical recesses 13 in the material of the coupling element 11 are located near the outer circumference of the coupling element 11 and their depth, measured in the direction of the cone axes, is about 10 to 20% of the radius of the cylindrical outer surface of the implement 11. The core angle of the conical recesses 13 in this embodiment 90°, but these angles could have other values, which can be fixed on the basis of the data of the desired construction. The conical recesses 13 open out at the cylindrical surfaces of the coupling element 11.

Figure 2:
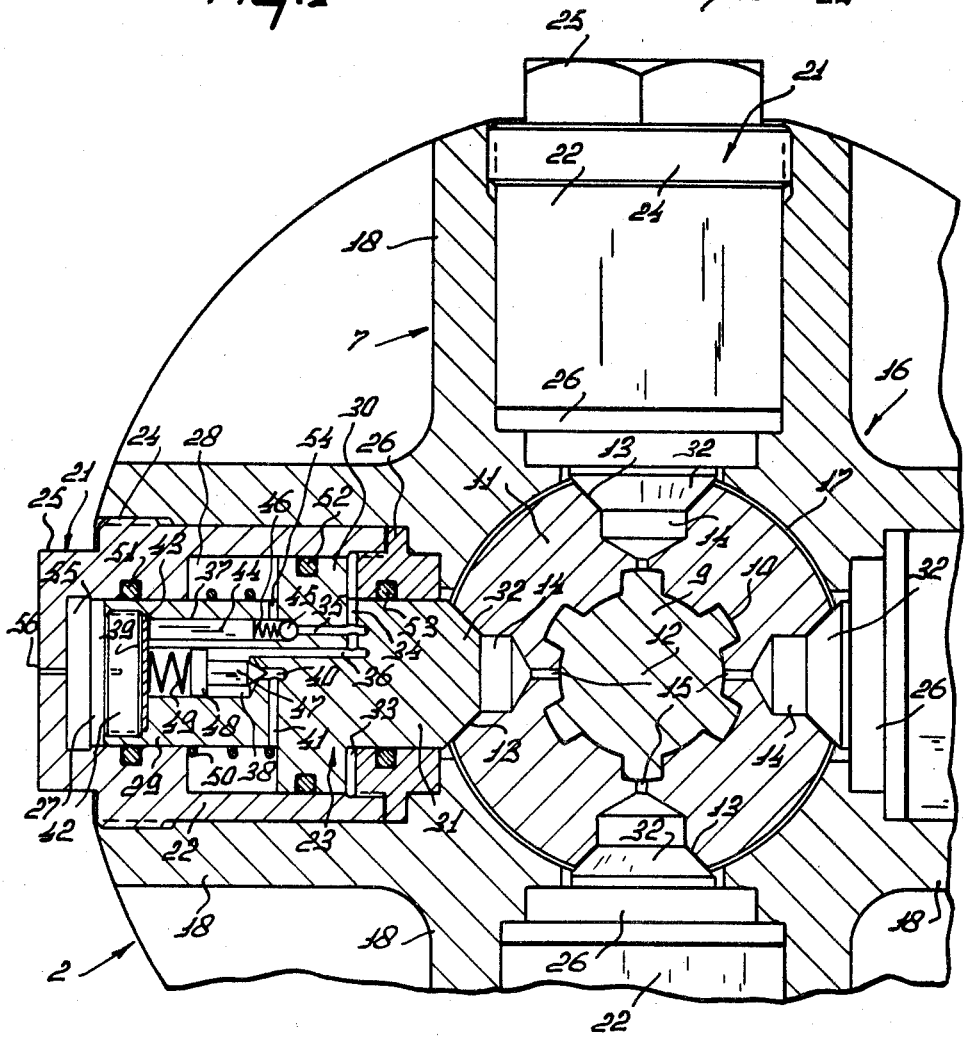
FIG. 2 is a sectional view taken on the lines II—II in FIG. 1.

The housing 7 of the end portion 2 comprises, apart from the coupling element 11, a holder 16 surrounding the element 11 (FIG. 2). The holder 16 is also symmetrical about the center line 12. The holder 16 comprises a hub portion bounded on the inner side by a hole having a substantially cylindrical surface 17, which is coaxial with the center line 12 and which fits around the cylindrical outer surface of the coupling element 11 so that relative rotation between the element 11 and the holder 16 is possible. The material of the hub portion of the holder 16 around the inner surface 17 is integral with, in this case, four cylindrical, hollow extensions 18. The center lines of the four cylindrical extensions 18 are located in a common plane which is perpendicular to the center line 12 and they intersect one another at the center line 12, and are at an angle of 90° to one another so that the extensions 18 are located in twos, diametrically opposite one another and are regularly distributed around the center line 12. The hub portion of the holder 16, from which the extensions 18 project, has on the side facing the universal coupling 6, fork members 19 and 20, in which one of the shafts of the universal coupling is journalled (FIG. 1).

Each of the hollow extensions 18 holds a detachable and replaceable coupling unit 21 (FIG. 2), which may be considered to be previously prepared and calibrated. Each coupling unit 21 comprises mainly two main parts, that is to say, a holder 22 and a plunger 23, which is movable relative to the holder 22. The design of the holder 22 and the plunger 23 will be apparent from the sectional view of FIG. 2. The holder 22 has a substantially cylindrical outer surface which has a screwthread along part of its length at the end remote from the coupling element 11, by which screwthread 24 the coupling unit 21 can be screwed into the cylindrical cavity of the respective extension 18, which fits closely around the unit 21. To enable it to be screwed in and out, the coupling unit 21 has a six-sided head 25, which projects, when fitted, out of the extension 18 for engagement by, for example, a standard spanner. The holder 22 has a closing piece 26 screwed into it on the side nearer the coupling element 11 to prevent the plunger 23 from leaving the holder 22. The interior of the holder 22 affords, going from its outermost end towards the coupling element 11, a cylindrical chamber 27, a cylindrical chamber 28 having a larger diameter than the part 27, and an opening in the closing piece 26, having, in this embodiment, the same diameter as the part 27. The chambers and the opening are coaxial. The plunger 23 comprises an outermost cylindrical part 29 located in that the chamber 27 and which also extends partly into the chamber 28. The part 29 is rigidly secured to a part 30 of the plunger 23 which bears on the wall of the chamber 28. The plunger 23 also has an innermost part 31 bearing on the wall of the opening in the closing piece 26. The innermost end of the portion 31 of the plunger 23 is conical, having the shape of a truncated cone, and bears in normal operation in the recess 13 of the coupling element 11; the conical end matches the recess 13.

From the foregoing it follows that the diameter of the portion 30 of the plunger 23 exceeds that of the portion 31. The portion 30 thus forms a shoulder of the plunger 23 with respect to the portions 29 and 31, this shoulder being located in normal operation near the closing piece 26. The dimensions of the unit are such that, when the conical end 32 engages the surface of its recess 13, the shoulder 30 is at a small distance from the closing piece 26 so that a narrow, annular gap 33 is formed between the shoulder 30 and the closing piece 26. The width of the gap 33, in the position illustrated in FIG. 2, measured along the center line of the plunger 23, will be referred to as the potential minimum value. The portion 31 of the plunger 23 has a radial bore 34 from which two axial bores 35 and 36 open; these axial bores extend outwardly away from the bore 34. The bore 35 meets a bore 37 having a larger diameter than the bore 35, but coaxial with it. The bore 37 runs for most of its length in the part 29 of the plunger 23 and for a small part in the part 30. The bore 36 opens out in a bore 38, the diameter of which is four- to five-times the diameter of the bores 35 and 36 and about twice the diameter of the bore 37. The bore 36 opens out near the outer wall of the bore 38. The center lines of the bores 38 and 36 are parallel to one another and both extend axially of the plunger 23. The bore 38 is formed in the part 29 of the plunger 23.

The bores 37 and 38 both open out in a cylindrical cavity 39, the center line of which like the center lines of the bores 35 to 38 extends axially of the plunger 23. The diameter of the cylindrical cavity 39 is 80 to 90% of the diameter of the part 29 so that the two bores 37 and 38 open into it. The bore 38 is coaxial with the plunger 23. The bore 38 terminates, at its end nearer the coupling element 11, in a bore 40 having a smaller diameter than the bore 38. The short bore 40 is formed substantially wholly in the portion 29 and joins a radial bore 41 opening into the chamber 28 around the part 29. The bore 41 extends to the opposite side of the axis of the plunger from the bore 34.

The bores 37 and 38 are closed at their ends nearer the head 25 by a cylindrical screw 42, which is screwed into the cavity 39, which is screw-threaded. There is packing 43 between the screw 42 and the neighbouring ends of the bores 37 and 38.

The bore 37 contains a distance piece 44, one end of which engages the packing 43. The transition region between the bores 35 and 37 is machined in a hemispherical shape. This transition region is closed by a ball 45, which can prevent passage of hydraulic fluid from the bore 37 towards the bore 35. Between the end of the distance piece 44 and the ball 45 there is a spring 46, which loads the ball 45 in the direction towards the bore 35 and into engagement with the hemispherical transition region.

The comparatively large bore 38 contains a pin 47, which is coaxial with the bore 38. The pin 47 has a conical tip, which normally seals the junction between the bores 38 and 40. At the end facing the screw 42 the pin 47 has a shoulder 48 fitting closely in the bore 38. The space between the shoulder 48 and the packing 43 communicates with the open air in a manner not shown and is therefore air filled and holds a calibrated biassing spring 49. The diameter of the pin 47 is smaller than that of the bore 38.

In the chamber 28 there is a comparatively slack spring 50 surrounding the part 29 of the plunger 23 and acting between the axial end wall of the chamber 29 formed by the holder 22 and the part 30. Between the inner wall of the holder 20 and of the closing piece 26 on the one hand the outer surfaces of the parts 29, 30 and 31 of the plunger 23 on the other hand there are provided packings 51, 52 and 53 for locally preventing leakage of hydraulic fluid. A bore 54 connects the space around the spring 46 with the space 28. In the position shown in FIG. 2, an air-filled chamber 55 is present between the plunger 23 and the head 25; this chamber communicates with the open air through a hole 56.

The other three coupling units 21 are identical to the one described; the conical ends 32 of the plunger 23 engage the corresponding recesses 13 of the coupling element 11. The recesses 13 and the ends 32 thus form latching means for interconnecting driven and driving elements of the coupling.

In normal operation the shaft 8 (for example the power take-off shaft of a tractor) is driven by the tractor engine, the driving torque being transmitted through the end portion 3, the universal coupling 5, the shaft 4, the universal coupling 6 and the end portion 2 to the input shaft 9 of the driven implement. In the holder 16 of the end portion 2 the driving torque is transferred from the holder 16 through the coupling units 21 to the coupling element 11 and hence through the splines 10 to the shaft 9. Between the coupling units 21 and the coupling element 11 the driving torque is transferred solely by means of the four conical ends 32 of the plungers 23 co-operating with the corresponding recesses 13 in the coupling element 11.

Each of the plungers 23 occupies, in normal operation, the position shown in FIG. 2, in which case it acts as a latch pin. Each plunger 23 is subjected in normal operation mainly to two forces which act radially outwardly. The first force is the centrifugal force on the mass of the plunger 23 due to the rotary speed of the end portion 2. Thus force tends to move the plunger 23 outwardly through the chambers 27 and 28. The second force exerted on the plunger 23 arises from the conical shape of the latching parts 13 and 32. Owing to the torque being transmitted components of force are produced between the coupling element 11 and the ends 32, which components also tend to move the plunger 23 radially outwardly.

The chamber 28, the annular gap 33, the bores 34, 35, 36, 40, 41 and 54 as well as the space between the pin 44 and the ball 45 and the space around the pin 47 are completely filled with hydraulic fluid. The volume of these fluid-filled spaces does not vary if the plunger moves outwardly with respect to the holder 22. As stated above the spring 49 has an accurately set bias tension. Owing to the aforesaid forces on the plunger 23 a given increase in pressure is produced in the fluid in the chamber 28 and in the bores 40, 41, 54 as well in the fluid between the pin 44 and the ball 45. The fluid urges the ball 45 onto its seat so that the bore 35 remains closed. The fluid pressure in the bore 40 is resisted by the force exerted by the spring 49 on the shoulder 48 and on the pin 47 while the fluid pressure does not exceed the counter-pressure exerted by the spring 49. Under this condition the hydraulic fluid in the last-mentioned spaces behaves like a very rigid substance since the fluid, for practical purposes, is incompressible.

When the combination of the centrifugal forces exerted on the plunger 23 and of the components exerted on the conical ends 32 attains a given value corresponding to a fluid pressure exceeding the bias tension of the spring 49, the pin 47 moves outwardly with respect to the plunger 23 so that communication is established between the chamber 28 via the bores 41 and 40 with the space around the pin 47, and the pressurized fluid will pass through the bores 38, 36 and 34 to the gap 33, the fluid thus passing through the plunger 23 from one side to the other of the part 30, and movement of the plunger with respect to the holder 23 is no longer hindered. In this case the conical ends 32 move out of the corresponding recesses 13 leaving the holder 16 free to turn freely about the coupling element 11. Thus the coupling prevents overload by interrupting the connection between two parts of the drive at a given speed and near a given torque magnitude by hydrostatic or hydraulic means. After the plungers 23 have moved outwardly and the holder 16 and the shaft 9 are disconnected, the holder 16 remains in the driven state so that centrifugal force still acts on the plunger 23. In this way the conical ends 32 are prevented from returning forcibly into engagement with the recesses 13 so that damage is avoided. Since after disconnection, the centrifugal force on the plungers 23 remains in existance and even increases as a result of the displacement of the plungers, re-connection is not possible at the comparatively high operational speed. The speed of the driving shaft 8 must then be reduced so that the comparatively slack spring 50 of each coupling unit 21 tends to move its plunger 23 radially inwardly. The hydraulic fluid present in the annular gap 33 is pressed back via the bores 35 and 34 through the bores 37 and 54, the ball being lifted against the slack spring 46. This return movement of the plunger 23 ends when the plunger re-occupies the position shown in FIG. 2, which is only attained at a comparatively low speed of the driving shaft 8. An excessively rapid return of the plungers 23 into the position shown in FIG. 2 can be prevented, if necessary, by providing a restriction in the bores 35 or 34. The conical ends 32 are then again located in the recesses 13 so that the connection between the holder 16 and the coupling element 11 and hence with the shaft 9 is re-established. After that, the speed of the driving shaft 8 may be raised again to the operational speed at which the intermediate shaft assembly 1 again will transfer the nominal torque.

If shock loads are expected, a restriction may, if desired, be provided in the bore 40 or 41 so that in operation the fluid pressure exerted on the pin 47 substantially corresponds to the average load.

It should be emphasized that the conditions of disconnection depends upon the speed (centrifugal force on the plunger 23) and the torque (the outwardly extending components of force on the locking parts 32). This means that the condition of disconnection, at least in an important range of speeds may be a measure for the torque transferred. The setting of the bias tension of the springs 49 is a measure for this power. Each of the coupling units 21 thus will transmit only part of the power at which disconnection takes place. Consequently a coupling unit 21 can be calibrated to a given value by adjustment of the bias tension of the spring 49, and can therefore be marked (for example, on the outer face of the head 25) by horsepower or kilowatt rating of the coupling unit 21 concerned. In the embodiment shown in FIG. 2 four coupling units 21 are provided. If each of these members is set to a rating of, for example, 25 HP, the intermediate shaft can transfer a power up to a maximum of 100 HP above which value disconnection occurs.

It is furthermore noted that the coupling units 21 are removable, for example, by means of a spanner fitting to the head 25, and can be replaced by another coupling unit 21, which is screwed into the screwthread 24 of the extension 18 concerned. After the removal of the coupling units 21 other coupling units, of different ratings, can be inserted. It is possible for only some of the total number of coupling units to be replaced by others.

The hydraulic nature of the exchangeable units means that the manufacture can deliver them already calibrated to a given rating, i.e. a given power, so that the user can simply insert a number of these units according to the desired maximum power to be transmitted. Reconnecting at low speed only prevents wear of the plungers 23 and of the recesses 13. The choice of material of the conical ends 32 and of the coupling element 11 depends, of course, on the surface pressures to be transferred. The plungers 23 constitute reciprocately latching means which can be released against a hydrostatic pressure, the number and setting of these latching means determining the maximum power to be transferred or the torque. If the power plant is an engine having a constant output speed (for example, in the case of a tractor having a Diesel engine), the maximum power that can be transmitted is also a measure for the maximum torque to be transmitted. In this case the following embodiment may also be employed.

Figure 3:
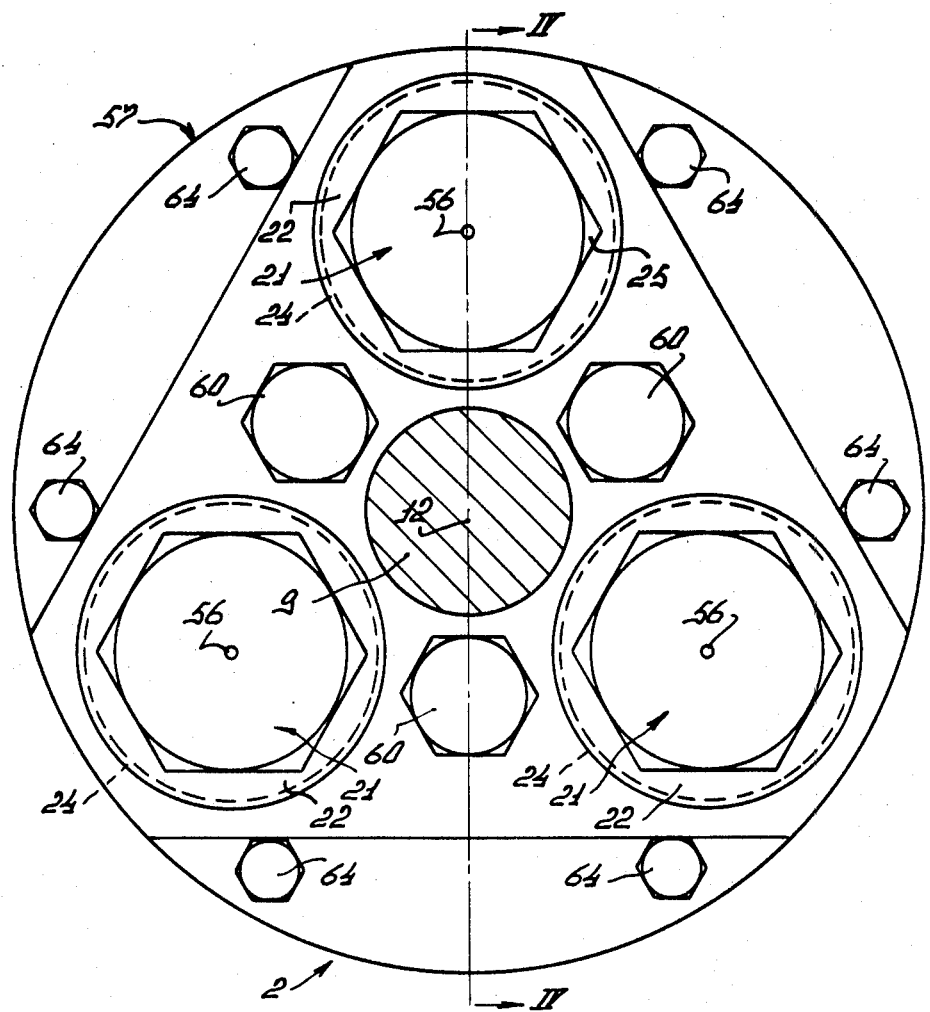
FIG. 3 is an elevational view of a second embodiment of coupling taken in the direction of the arrow II in FIG. 1.
Figure 4:
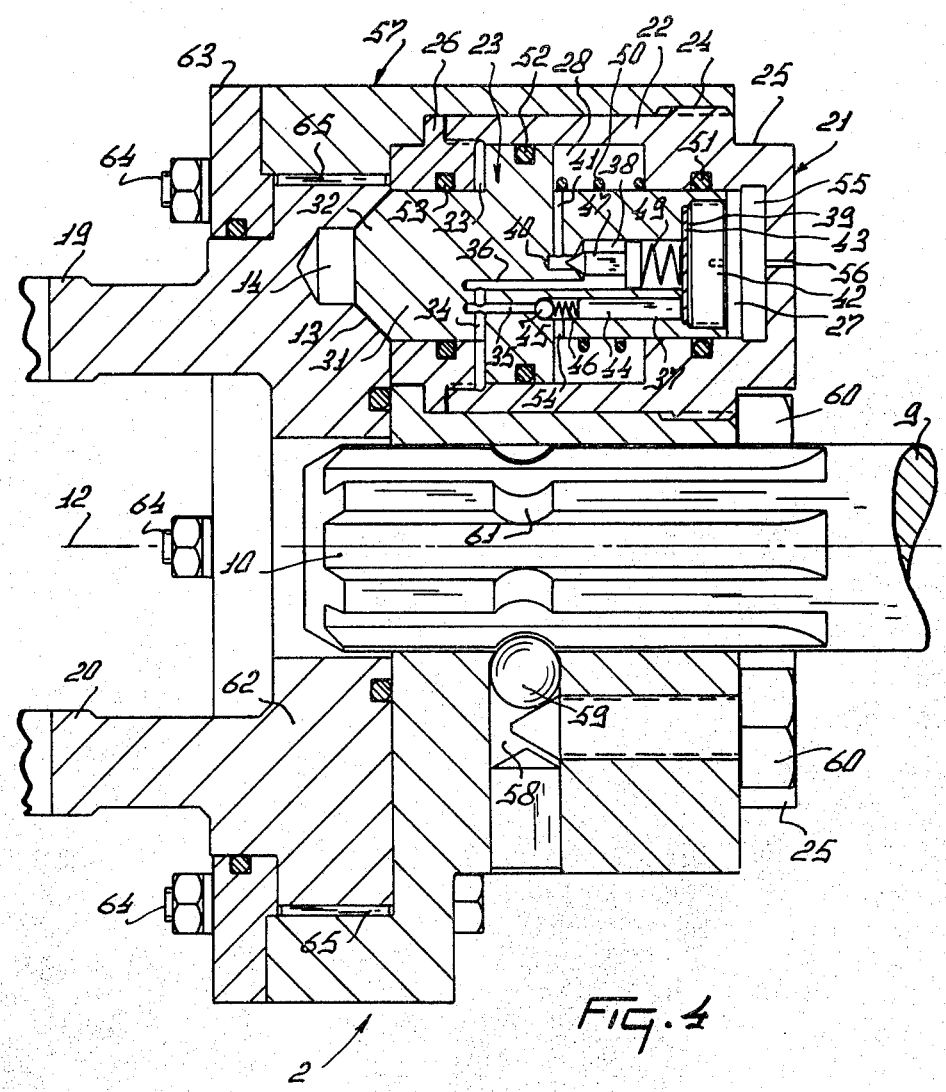
FIG. 4 is a sectional view taken on the lines IV—IV in FIG. 3.

In the embodiment shown in FIGS. 3 and 4, the shaft 9 forming the input shaft of the implement to be driven is inserted into a holder 57 which is part of the end portion 2. For this purpose the holder 57 has internal splines fitting to the external splines 10 of the shaft 9. In order to prevent the shaft 9 from coming out axially from the end portion 2 a ball 59 is provided is a bore 58 in the holder 57, the diameter of the bore corresponding with that of the ball 59. The ball 59 is held in place during operation by the conical end of an axially extending safety bolt 60, the end being positioned in the bore 58 so that the ball is fixed in place in the bore 58 between the conical end of the bolt 60 and a groove 61 provided in the splines 10 around the shaft 9. The ball 59 prevents the shaft 9 from moving in an axial direction with respect to the holder 57. In this embodiment three combinations of a ball 59 and a safety bolt 60 are arranged around the shaft 9.

On the side facing the universal coupling 6 the holder 57 is clamped to a fork holder 62, which is substantially cylindrical and coaxial with the center line 12 of the shaft 9 and of the holder 57. The fork holder 62 has the two fork parts 19 and 20 receiving one of the pivotal shafts of the universal coupling 6. The holder 57 is clamped in an axial direction to the fork holder 62 by a locking ring 63, which is fixed to the holder 57 by a plurality of bolts 64 (see also FIG. 3). The assembly of the locking ring 63 and the holders 57 is rotatable with respect to the fork 62 around the center line 12 (FIG. 4). To this end a needle bearing 65 is arranged between the cylindrical outer surface of the fork holder 62 and the adjacent boundary face of the holder 57. In normal operation the relative rotation of the fork holder 62 and of the assembly of the locking ring 63 and the holder 57 is prevented by three coupling units 21 arranged in the holder 57 and each having a conical end or latching part 32 engaging the corresponding recess or latching part 13 in the fork holder 62. In contrast to the first embodiment, in which the center lines of the plungers 23 of each coupling unit 21 extend radially, the center lines of the plungers 23 in this embodiment extend axially and are spaced from the center line 12. The construction of the coupling units 21 in this embodiment is identical to that of the first embodiment, and the parts of the unit are therefore designated by the same reference numerals.

In normal operation the conical ends 32 of the coupling units 21 are located in the recesses 13, the torque to be transmitted via the fork parts 19 and 20 to the fork holder 62 being passed completely via the recesses 13 to the conical ends 32 of the coupling units and hence to the holder 57 and the shaft 9. At a given maximum torque, adjusted by means of the bias tension of the springs 49, the plungers 23 are urged out of the recesses 13 by the components of force exerted by the torque. Owing to the movements of the plungers 23 with respect to the associated holders 22 the operation of the units is approximately the same as in the first embodiment. The pin 47 and the spring 49, as in the first embodiment, form parts of an adjustable pressure relief valve. Also in this case the hydraulic fluid in the coupling units 21 will behave like a very rigid body prior to the attainment of the maximum torque to be transmitted, whereas after that torque is reached and the fluid pressure corresponds to the bias tension of the spring 49, the fluid will escape through the plunger 23 so that the plunger 23 is no longer held in place by the fluid. The fork holder 62 is then disconnected from the holder 57 and hence from the shaft 9. When subsequently the speed and the torque to be transmitted are reduced, the plungers 23 will re-enter their recesses 13 under the action of the fairly slack spring 50, so that the pin 47 will close the opening of the bore 40 and the effective torque can again be transmitted. Consequently, the plunger 23 is a double-acting member. If the intermediate shaft 1 is connected between a tractor and a driven implement, the user need not leave his seat on the tractor to reset the overload coupling ready for use. If the intermediate shaft is driven by means of a diesel engine, for example, in the case of a tractor, the operational speed is normally substantially constant so that in use the effective torque to be transferred is a measure of the power produced. Adjustment of the coupling units 21 again provides variability of the power transmitted so that each of the coupling units 21 can be marked with the power at which disconnection occurs. As is shown in FIG. 3, three coupling units 21 are provided, each of which will transmit a maximum power of 33 HP, so that in this embodiment an engine power of about 100 HP can be transmitted. The coupling units 21 may, of course, be exchanged for coupling units adjusted to a higher or lower maximum power. If desired, the restrictions referred to above may be provided in the coupling units 21.

In the third embodiment shown in FIGS. 5 to 9 the fork parts 19 and 20 are again fastened to a fork holder 62 having a cylindrical outer rim, which is coupled by bolts 66 with an annular coupling element 67 having an L-shaped cross-section, a spacer ring 68 and a locking ring 69. The parts 67, 68 and 69 are disposed near the outer periphery of the end portion 2 side by side in an axial direction and join the outer rim of the fork holder 62. A limb of the coupling element 67, which is coaxial with the center line 12, abuts the spacer ring 68 on its inner side and engages with its face remote from the fork holder 62 the inner side of the locking ring 69. The parts 62 and 66 to 69 form a rigid unit. The parts of the coupling element 67 located within the spacer rings 68 is again provided with a number of recesses or latching means 13, in this embodiment two having a conical surface flaring in the direction of the center line 12, while the tip of the cone is located approximately midway through the thickness of the spacer ring 68. The center lines of the conical surfaces of the recesses 13 are in line with one another, and perpendicularly intersect the center line 12. The cylindrical inner face of the part of the coupling element 67 having the recesses 13 intimately engages a holder 70, which is substantially coaxial with the center line 12 and which has internal splines engaging the external splines 10 of the shaft 9. The holder 70 is, in operation, rigidly connected with the shaft 9. The holder 70 is clamped in an axial direction between the fork holder 62 and the locking ring 69, which is located in a recess in the holder 70. The shaft 9 is fixed axially within the holder 70 by balls 59 and safety bolts in the same manner as in the preceding embodiment.

It should be noted that the coupling element 67 has bores 71 extending axially and opening out into the recesses 13. The two bores 71 open at their other ends into an annular space 72 between the fork holder 65 and the holder 70.

Figure 6:
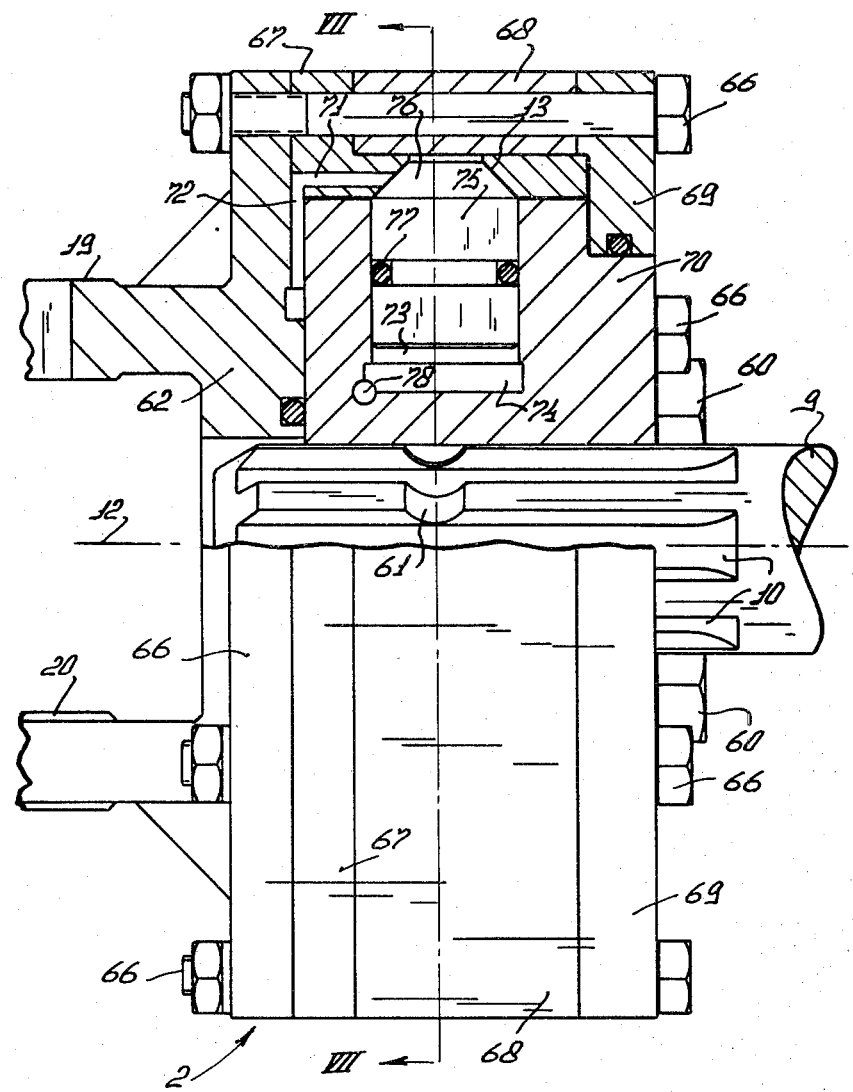
FIG. 6 is partly a sectional view and partly an elevational view taken on the lines VI—VI in FIG. 5.

The holder 70 has two diametrically opposite, cylindrical chambers 73, the center lines of which coincide, in normal operation, with the center lines of the two conical surfaces of the recesses 13 so that the cylindrical chambers are orientated radially. The diameters of the cylindrical chambers 73 correspond with the diameters of the circles formed by the recesses 13 at the boundary surface of the coupling element 67 facing the holder 70. The ends of the cylindrical chambers 73 nearer the shaft 9 meet cylindrical chambers 74 having a diameter slightly exceeding that of the chambers 73. The length of each cylindrical chamber 73 measured along its center line is about 35% of the radius of the cylindrical outer face of the end portion 2, whereas the length of each cylindrical chamber 74 along its center line is about 6% of that radius. The distance between the center line 12 and radially outer end of the chamber 73 (i.e. the boundary face between the coupling element 67 and the holder 70) is about 75% of the radius of the cylindrical outer face of the end portion 2 (FIG. 6). Fitted in the cylindrical chamber 73 is a plunger or latching pin 75. The cylindrical plunger 75 has a conical end or latching part 76, which is located in normal operation in one of the recesses 13 in the coupling element 67. The plunger 75 has a seal 77 for preventing leakage of fluid between the plunger 75 and the holder 70.

Figure 7:
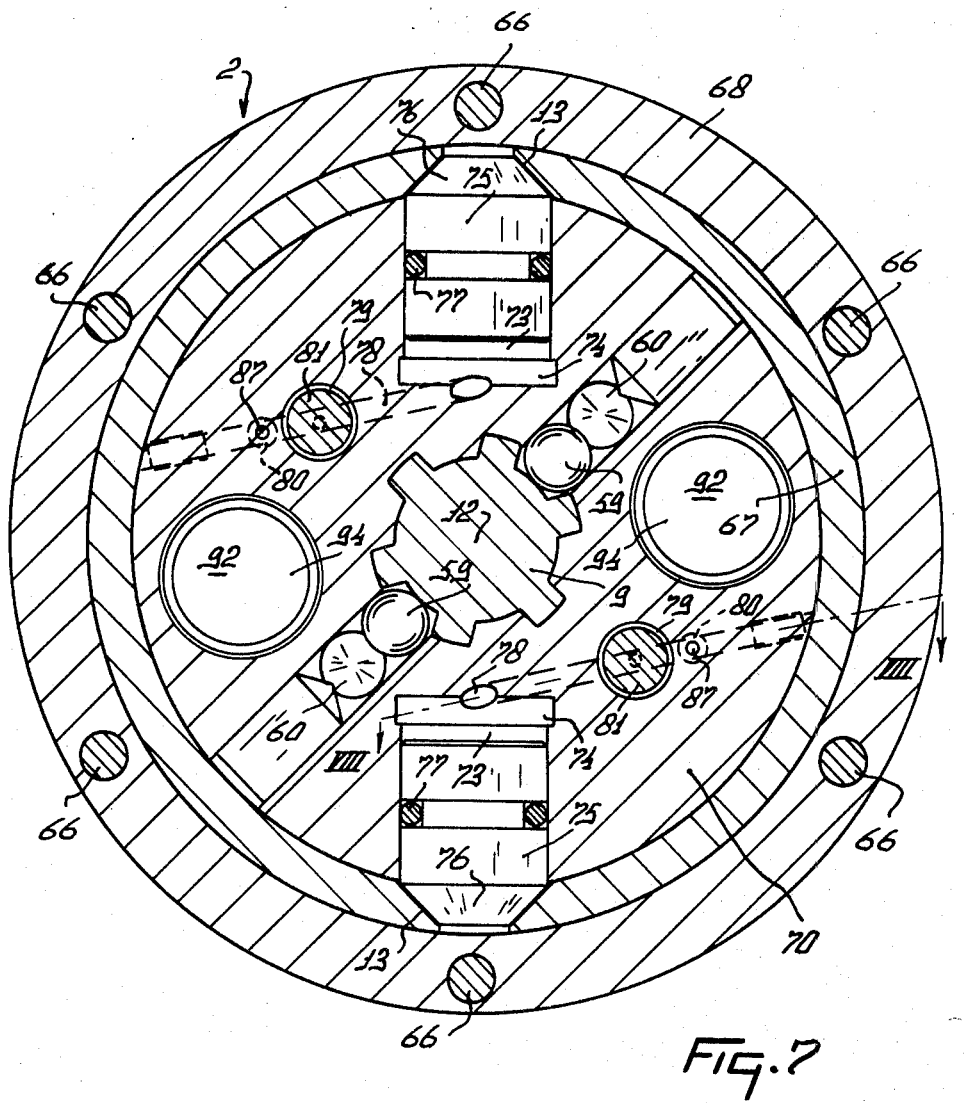
FIG. 7 is a sectional view taken on the lines VII—VII in FIG. 6.
Figure 8:
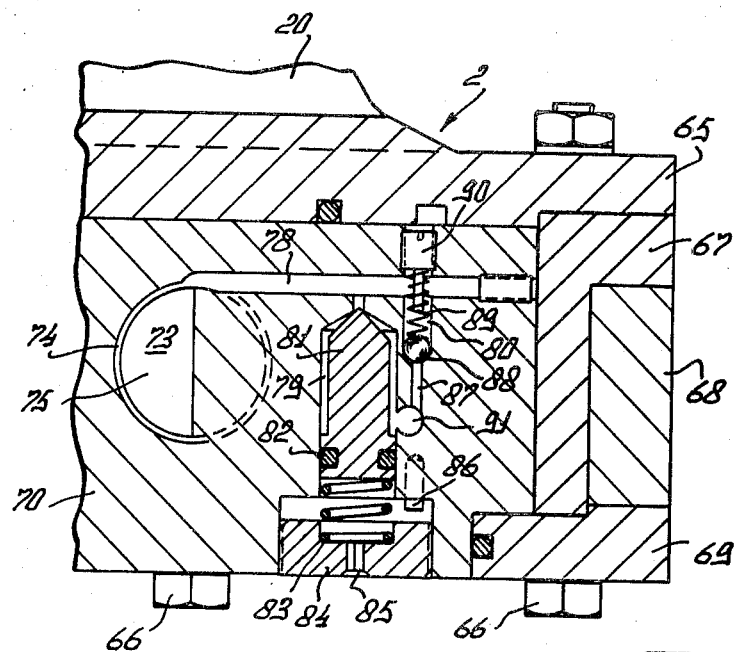
FIG. 8 is a sectional view taken on the lines VIII—VIII in FIG. 7.
Figure 9:
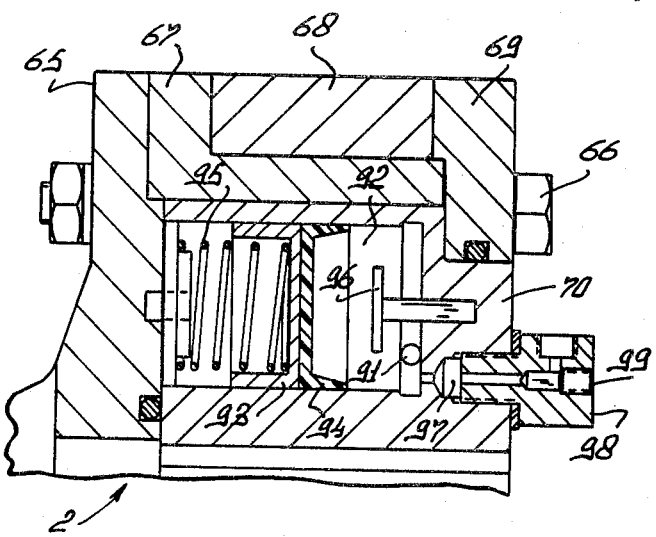
FIG. 9 is a sectional view taken on the lines IX—IX in FIG. 5.

The holder 70 has a bore 78 extending tangentially of the chamber 74, as viewed in a direction parallel to the center line of the chamber 74, this bore 78 opening out into the chamber 74 at a region forming part of the cylindrical boundary surface of the chamber 74 (FIGS. 6 and 8). From FIG. 7 it will be apparent that the direction of the bore 78 is inclined to a plane perpendicular to the center lines of the chambers 73 and 74. The bore 78 establishes a communication between the chambers 73 and 74 and a cylindrical chamber 79 and opens out into a bore 80 provided in the holder 70. The center lines of the cylindrical chamber 79 and of the bore 80 are parallel to the center line 12. The cylindrical chamber 79 has a conical shape in the region where it meets the bore 78 and is closed in that region in normal operation, by the conical end of a plunger 81 located in the chamber 79 and sealed at 82 with respect to the surrounding material of the holder 70. The plunger 81 is loaded at its end away from the bore 78 by a calibrated spring 83, whose end away from the plunger 81 engages a set screw 84. The set screw 84 has a hole 85 of square cross-section for receiving a hollow key. The hole 84 furthermore establishes a communication between the space between the plunger 81 and the set screw 84 and the open air, and so this space is air-filled. Using a hollow key, the set screw 84 can be turned with respect to the holder 70 until a stop pin 100 (FIG. 5) fastened to the screw 84 comes into contact with a stop 86 fixed in the material of the holder 70. The two stops project into the space between the plunger 81 and the screw 84. The set screw 84 can thus be turned at the most through one revolution (FIG. 8).

Figure 5:
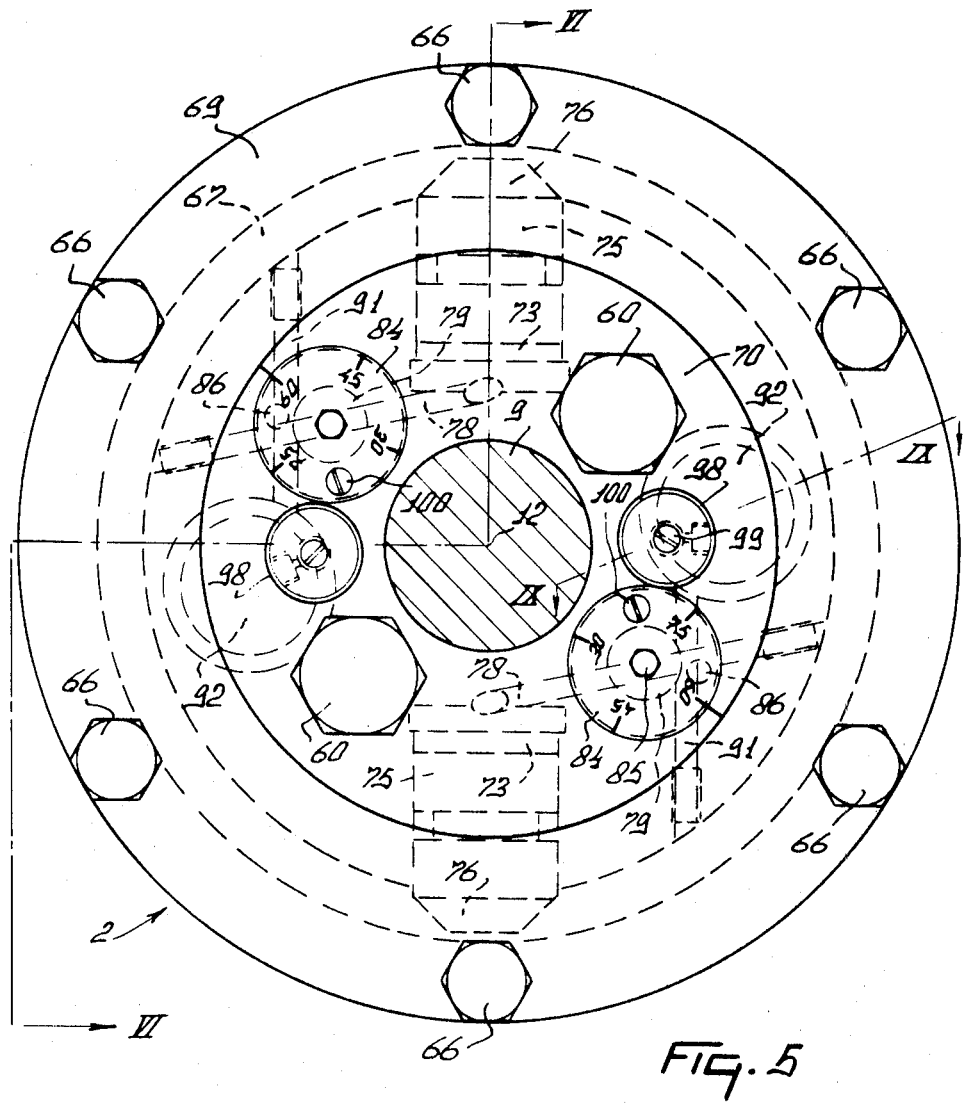
FIG. 5 is an elevational view in the direction of the arrow III in FIG. 1 of a third embodiment of coupling.

The bore 80 located immediately at the side of the chamber 79 has an extension bore 87 which is coaxial with the bore 80. The diameter of the extension bore 87 is smaller than that of the bore 80. The transitional surface between the bores 80 and 87 is machined in a hemispherical shape and serves as a seat for a ball 88, which is urged against the hemispherical surface by a spring 89. The end of the spring 89 away from the ball 88 engages a set screw 90, which also serves to block the channel in which it is fitted. From FIG. 8, it will be appreciated that the part of the plunger 81 facing the bore 78 has a diameter which is smaller than the diameter of the cylindrical chamber 79 and which is also smaller than that part of the plunger in which the seal 82 is provided. The annular space thus providing between the part of the plunger 81 facing the bore 78 and the wall of the cylindrical chamber 79 communicates with a bore 91, the center line of which is perpendicular both to the center line of the space 79 and the center line 12. The bore 91 communicates (see FIG. 8) also with the bore 87 and extends tangentially to the wall of the chamber 79. The bore 91 opens out into a cylindrical chamber 92 (FIGS. 5, 7 and 9), the center line of which is parallel to the center line 12. The chambers 92 are located one on either side of the cylindrical chambers 73 (FIGS. 5 and 7). Each chamber 92 has a piston 93 having a cup seal 94 whose open side faces the opening of the bore 91 into the chamber 92. The piston 93 is spring-loaded at its end away from the bore 91 by a comparatively slack spring 95, whose end away from the piston 93 engages a boundary surface of the fork holder 62. The end wall of the chamber 92 near the bore 91 has a stop 96 which prevents the rim of the cup seal 94 from coming into contact with the end wall of the chamber 92 in its end position. Finally, a bore 97 opens into the chamber 92 near the end of the bore 91. The bore 97 has a screwthread for receiving a filling plug 98 for filling the overload coupling with hydraulic fluid through the bore 97. After filling, the bore 97 is closed by a plug 99. Each of the two chambers 73 and the plungers 75 have their own associated parts 78 to 99.

In operation the conical ends of latching parts 76 of the plungers 75 are located in the corresponding recesses or latching parts 13 in the coupling element 67 (this is the position shown in FIGS. 6 and 7) and constitute in this position a latch connection between the driving shaft 8 and the driven shaft 9. The portions of the two chambers 73 located on the sides of the plungers 75 remote from the ends 76, the chambers 74, the bores 78, the annular spaces around the sides of the plungers 81 facing the bores 78, the bores 80, 87 and 91 as well as the portions of the chambers 92 located on the sides of the packings 94 facing the bore 91 and the bores 97 are filled with hydraulic fluid introduced through the filling opening 98. Since this fluid is, for practical purposes, incompressible, and is completely enclosed, it behaves like a rigid mass holding, in normal operation, the two conical ends 76 in the two recesses 13 so that the latching connections are maintained. The torque transferred via the fork parts 19 and 20 to the coupling elements 67 exerts, owing to the conical shapes of the ends 76, component forces on the two plungers 75 in a direction parallel to the center of the plungers and perpendicular to the center line 12. In operation the plungers 75 are urged outwardly by centrifugal force acting on them so that this centrifugal force reduces the fluid pressure resulting from the transmitted torque. In during operation the transmitted torque, for example, as a result of obstruction of the driven implement, increases to a critical value, the conical end of the plunger 81 (FIG. 8) is loaded by the fluid pressure to the extent that the calibrated tension of the spring 83 is exceeded, as a result of which the plunger 81 moves in the chamber 79 towards the set screw 84. The fluid displaced by the movement of the plungers 75 passes through the space around the plunger 81 into the bore 91. Since the fluid pressure on either side of the ball 88 has the same value, the ball 88 remains pressed onto its seat by the comparatively slack spring 89. The fluid flows through the bore 91 into the chamber 92. Owing to the increasing fluid pressure the comparatively slack spring 95 is compressed so that the space available for the fluid in the chamber 92 increases and so the plungers 75, having each a chamber 92 at their disposal, can move radially inwardly to disconnect the coupling.

When the speed of the driving shaft 8 and hence the torque are reduced to a low value so that the fluid pressure is reduced also to a low value or to zero, the spring-loaded piston 93 will urge back the fluid through the bore 91. The spring 83 will in the meantime have pressed the plunger 81 again to its seat. The returning fluid will therefore lift the ball 88 and flows through the bore 78 into the chambers 73 and 74, the plungers 75 thus again entering the recesses 13. This can be achieved by causing the driving shaft to rotate at a very low speed so that damage of the conical ends 76 and of the recesses 13 is avoided. Then the full operational torque can again be transmitted. At the re-establishment of the coupling, the air present in the latching parts 13 and 76 during discoupling is discharged through the bore 71 into the space 72.

Since the plungers 75 are loaded, in normal operation by centrifugal force, the value of the torque at which disconnection occurs is relatively higher at relatively high operational speeds than at lower operational speeds, the power to be transmitted being constant. Therefore, the above described construction is suitable for use, for example, in drives in which at higher operational speeds with the same power higher shock loads of the driving torque may be expected than at lower operation speeds.

The calibrated bias tension of the spring 83 in this embodiment together with the centrifugal force exerted on the plungers 75 determines the value of the torque which disconnection occurs. The plunger 81 and the spring 83 again constitute an adjustable pressure relief valve.

In this embodiment the displaced hydraulic fluid does not pass across the plungers as in the former embodiments but it is pushed towards a chamber located away from the plungers, while the plunger-spring structure determining the instant of connection is also located away from the plunger and is thus not exposed to centrifugal forces.

The outer side of the set screws 84 can be marked with the value of the power at which disconnection will take place at constant speed, in horsepower or kilowatts as shown in FIG. 5 on the set screws 84. By means of a hollow key inserted into the holes 85 the set screws 84 can be turned so that the bias tension of the springs 83 is changed to an extent such that the plungers 75 disconnect at the new power value. The calibration of the coupling and in particular of the springs 83 and the set screws 84 is carried out by the manufacturer. The critical coupling values at which disconnection takes place is determined also in this case solely by the combination of the plunger 81 and the spring 83. It should be noted that the fluid pressure at the instant of disconnection is exerted on a comparatively small surface of the plunger 81 so that the spring 83 is comparatively stiff and has a comparatively high bias tension. The spring 95 is subjected over a comparatively large surface to the fluid pressure and it is therefore comparatively slack. In order to avoid, for example, hunting of the plungers 75 during disconnection of during connection restrictions may also in this case be provided, for example, in the bore 78 and in the bore 87 or in the bore 91.

All preceding embodiments have been described as being in conjunction with an intermediate shaft 1, but it is emphasized that the coupling provided in the end portion 2 may be provided as well on the power take-off shaft of a tractor, a motor vehicle or the like, so that it is associated with the tractor or the like. In this case the parts 11, 57, 70 are rigidly secured to the power take-off shaft and the parts 18, 62 have internal splines engaging splines on for example, an intermediate shaft.

The fourth embodiment is arranged actually on the driving machine, in this case, a tractor, the rear (or front) of which is designated by reference numeral 101. This part of the tractor has a power take-off shaft 102 (FIG. 10) from which machines or implements to be coupled with the tractor can be driven. Near the part 101 of the tractor there is located the end of a shaft 103 directly driven by the tractor engine and journalled at a short distance from its end in a partition 104 which may be part of the tractor frame or of the driving housing of the tractor. The end of the shaft 103 is spaced from the partition 104 and is surrounded by a cover 105 which accomodates a mechanism 106 for the adjustment of the various speed of the power take-off shaft 102 and, in addition, part of a construction according to the invention.

Figure 10:
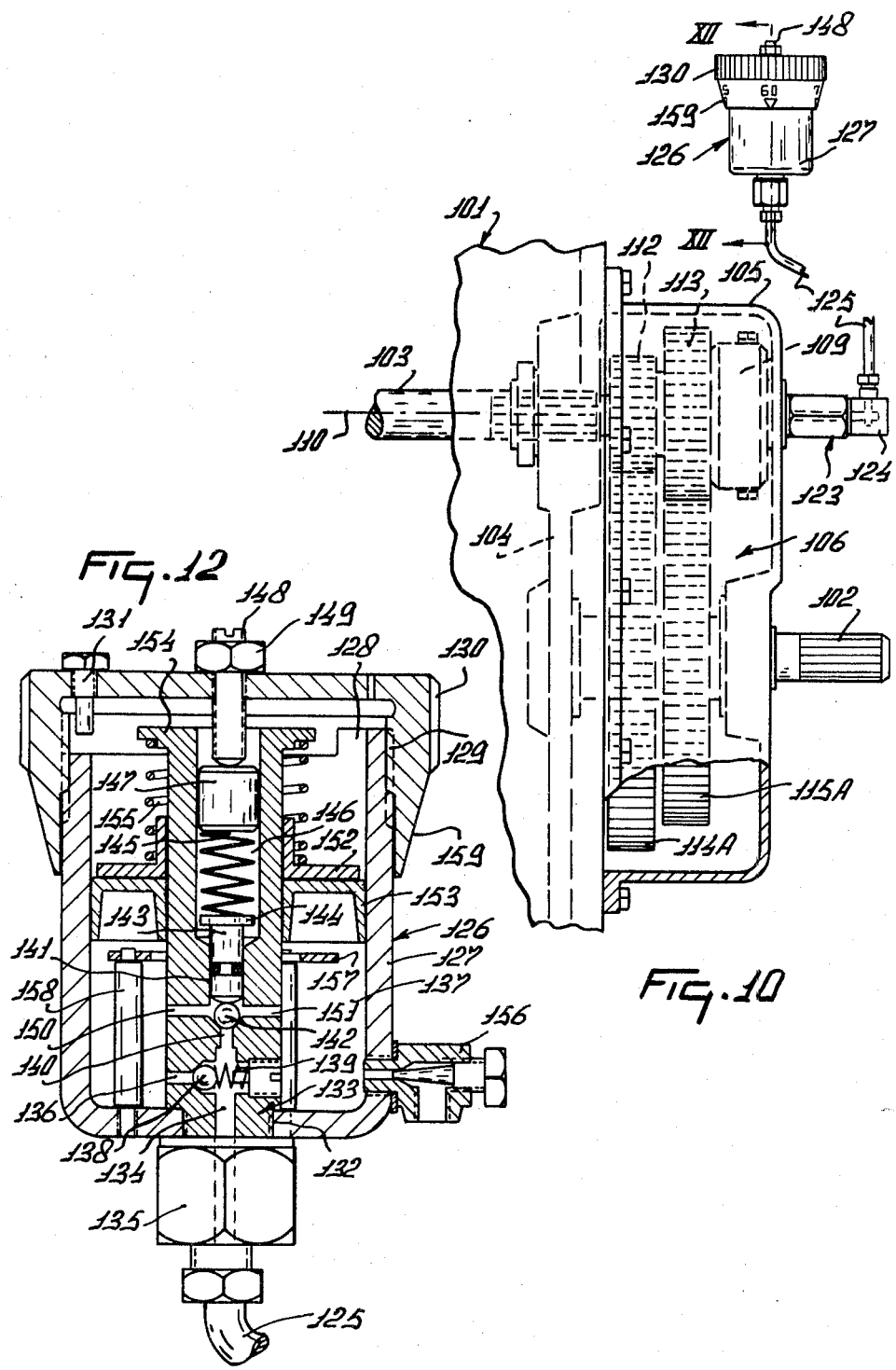
FIG. 10 is an elevational view of a fourth embodiment of coupling.
Figure 11:
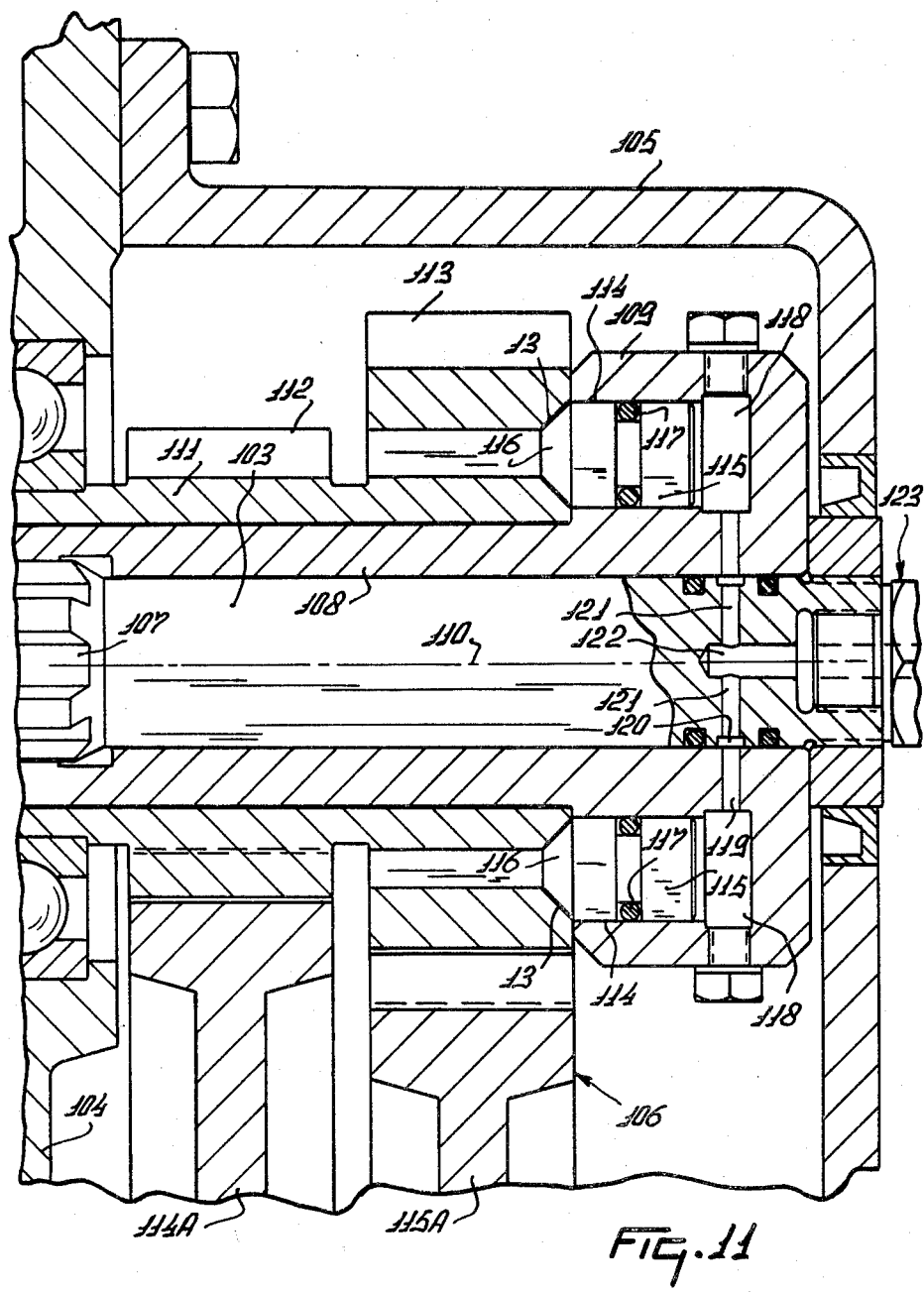
FIG. 11 is an enlarged sectional view part of the construction shown in FIG. 10.

The shaft 103 is provided near the partition 104 with external, axial splines 107 engaging splines in the interior of a bushing 108 which closely surrounds the outermost end of the shaft 103 and is constantly coupled with the shaft 103 (FIG. 11). The bushing 108 is provided at its end away the partition 104 with a radially projecting holder 109 which is integral with the bushing 108 and is substantially cylindrical. The cylindrical outer surface of the holder 109 is coaxial with the center line 110 of the shaft 103. The holder 109 ends, away from the partition 104, a short distance inwards from the cover 105, and at its other end is some distance from said partition 104. Between the holder 109 and the partition 104 the bushing 108 is surrounded by a bushing 111, which fits closely around and is rotatable about the outer circumference of the bushing 111 carries two integral axially successive gear wheels 112 and 113 which have different pitch circles. The gear wheel 113 has the larger pitch and has an end surface abutting the holder 109. The gear wheel 112 is disposed between the partition 104 and the gear wheel 113. The bushing 111, together with the gear wheels 112 and 113, is normally rotatable relative to the bushing 108. The two gear wheels 112 and 113 are constantly in mesh with gear wheels 114A and 115A respectively (FIGS. 10 and 11) which are also accommodated within the cover 105. The gear wheels 114A and 115A are journalled on a shaft which itself is journalled at one end in the partition 104 and at the other end in the outer wall of the cover 105. An opening in the shaft carrying the gear wheels 114A and 115A receives the power take-off shaft 102. The power take-off shaft 102 can be inserted by one or the other end into the shaft carrying the gear wheels 114A and 115A; in the former case the power take-off shaft is coupled with gear wheel 114A and in the latter case it is coupled with the gear wheel 115A so that at a constant speed of the shaft 103 two output speeds of the power take-off shaft can be obtained depending on the way the power take-off shaft 102 is inserted. In the case of an agricultural tractor it is common practice to drive the power take-off shaft at 540 rev/min or at 100 rev/min at an engine speed of, for example, 2100 rev/min.

The gear wheel 113 has a number of recesses or latching parts which are designated, as before, by reference numeral 13. The recesses 13 again have a conical shape, the center lines of the cones being in this case parallel to the center line 110 and they are all the same distance from the center line 110. The recesses 13 are arranged so that their walls thereof diverage in the direction towards the holder 109. The gear wheel 113 may have, for example, two or four recesses 13 evenly distributed about the center line 110. For each recess 13 there is a cylindrical chamber 114 in the holder 109. The centre line of each cylindrical chamber 114 coincides, in normal operation, with the cone axis of the corresponding recess 13 so that it is also parallel to the center line 110. Each chamber 114 containing a plunger 115 provided on the side facing the gear wheel 113 with a conical end or latching means 116, the conical surface of which matches the corresponding recess 13. Each plunger 115 co-operates, in normal operation, with a recess 13 to establish a latch connection. Each plunger 115 has a seal 117 engaging the surface of the chamber 114. Each chamber 114 terminates on the side away from the gear wheel 113 in a cylindrical chamber 118 having a diameter slightly greater than that of the chamber 114. From each chamber 118 extends a bore 119, the center line of which is perpendicular to the center line 110, this bore opening out in a continuous groove 120 going round the outer surface of the shaft 103. Radial bores 21 connect the groove 120 with a central bore 122 which is coaxial with the center line 110; this bore extends from the openings of the bores 121 away from the partition 104 to open out at the end face of the shaft 103, which is supported and sealed near that end face by the inside wall of the cover 105. The bore 122 has screwthread near its end for receiving a rotatable hydraulic union 123 for establishing a hydraulic connection between a rotating and a non-rotating part. The stationary part of the connection 123 which extends outside the cover 105 may, if necessary, be supported on the cover 105, is provided with a coupling part 124 having passages which connect the bore 122 with a hydraulic conduit 125. This conduit 125 is connected with the coupling part 124 at one end, and its other end is connected with an adjusting member 126 (FIG. 10). The adjusting member 126 (FIG. 12) is preferably arranged on the dashboard of the tractor driver, or at least somewhere where he can reach it without leaving his seat.

The adjusting member 126 comprises a cylindrical housing 127. The conduit 125 is connected with the outer side of the bottom end wall of the bushing. The housing 127 has at its open upper end a wall provided with an axially projecting lug 128. Near its open end the housing 127 is provided with an external screwthread 129 for receiving a setting knob 130, which partly surrounds the housing 127 and acts as a cap for it. On its inner side the seat screw 130 has a pin 131 disposed so that it will come into contact with the lug 128 when the set screw 130 is turned with respect to the housing 127 so that at the most the set knob 130 can turn about one revolution.

The bottom wall of the housing 127 has a rapped hole 132 which receives a cylindrical holder 133, whose diameter is about 40% of the inner diameter of the housing 127. The holder 133 is coaxial with the housing 127. The holder 133 has a bore 134 which communicates directly with the conduit 125, which is connected to the member 126 at union 135. The bore 134 is coaxial with the housing 127 and the holder 133. The bore 134 communicates through a radial bore 136 with a chamber 137 provided between the outer circumference of the holder 133 and the inner wall of the housing 127. In normal operation, the bore 136 is shut off from the bore 134 by a ball 138, which is substantially located in the bore 134 and which is spring-loaded to close the bore 136 by a light spring 139. The bore 134 is extended axially as a bore 140. The bore 140 is itself extended axially as a bore 141, which is coaxial with the holder 133; its diameter exceeds the diamter of the bore 140. In normal operation, the transitional area between these two bores is closed by a ball 142 located by a spring-loaded plunger 143 fitting in the bore 141. The plunger 143 has a shoulder 144 which supports one end of a calibrated spring 145. The spring 145 is disposed in a bore 146 which has a diameter greater than that of the bore 141. The end of the spring 145 away from the plunger 143 bears on a piston 147 which is disposed in the bore 146 and which sealingly engages the boundary surface of that bore. The end of the piston away from the spring 145 bears on the end of a screwthreaded pin 148 in the setting knob 130. The position of this pin with respect to the setting knob 130 can be fixed by means of a nut 149. The ball 142, the plunger 143, the spring 145, the piston 147 and the pin 148 form part of an adjustable pressure valve which can be adjusted by the setting knob 130.

The bore 141 has radial bores 150 and 151, which can establish a communication between the bores 140, 141 and the chamber 137. The bores 150 and 151 are positioned so that when the ball 142 shuts off the bore 140 from the bore 141, the bores 150 and 151 are also shut off from the bore 140.

On the holder 133 there is a piston 152 which can move in the chamber 137. On the side nearer the bottom of the housing 127 the piston 152 is provided with a cup seal 153 which seals against the leakage of the fluid from one side of the piston 152 to the other. The holder 133 has at its end nearer the setting knob 130 a shoulder 154 supporting one end of a comparatively slack spring 155, which surrounds the holder 133. The other end of this spring 155 bears on the piston 152. At a place near the bottom of the housing 127 the chamber 137 has a filling plug 156.

The parts of the chambers 114 not occupied by the plungers 115, the chamber 118, the bores 119, the grooves 120, the bores 121 and 122, the conduit 125 the bores 134, 136, 140, 150, 151 as well as the part of the chamber 137 beneath the seal 153 are filled with hydraulic fluid which is introduced through the filling plug 156. The part of the chamber 137 beneath the seal 153 has a stop ring 157 supported on posts 158 resting on the bottom of the housing 127; this ring 157 is a stop for the sleeve 153.

In operation, the shaft 103 is driven by the tractor engine and the torque is transmitted by the shaft 103, in the case of a diesel engine running with a substantially constant speed, this torque is a guide of the output power. The shaft 103 is coupled via the splines 107 with the bushing 108, which, in operation, is constantly driven by the shaft 103. Under normal conditions, i.e. in which the implement attached to the power take-off shaft 102 does not encounter resistance such as to produce a critical value of the power or torque, the conical ends 116 of the plungers 115 are in the recesses 13 of the gear wheel 113 so that the shaft 103 also drives the gear wheels 112 and 113 connected by the bushing 111 and hence also the gear wheels 114A and 115A. Depending on how the power take-off shaft 102 is inserted, it is driven either by the gear wheel 114A or by the gear wheel 115A, the speed of the power take-off shaft and hence the speed of the driven implement being in one case about half that in the other case. The torque transmitted by the ends 116 to the gear wheel 113 depends on the speed of the implement and in normal operation the speed of the gear wheels 112 and 113 is invariably equal to that of the driving engine, independently of the speed of the implement. The hydraulic fluid located behind the plungers 115 in the relevant chambers and bores is completely enclosed so that it will behave, in normal operation, as a rigid mass. If the driven implement is wholly or partly obstructed so that the absorbed power attains a critical value set by the bias tension of the spring 145, the fluid pressure increases to an extent such that the ball 142 is lifted against the bias tension of the spring 145, the plunger 143 thus moving towards the piston 147. The fluid then flows out of the chambers 114 and 118 via the bores 119, 121, 122, the conduit 125, the bore 134, the bore 149, through the bores 150 and 151 into that portion of the space 137 in which the bores 150 and 151 open. Thus the piston 152 is urged against the pressure of the comparatively slack spring 155 towards the setting knob 130. Since the fluid pressure on either side of the ball 138 is the same, the ball remains in place. As a result of the hydraulic fluid flowing into the chamber 137, the plungers 115 move towards the chambers 118 so that the conical ends 116 move out of the recesses 13 and the driving connection between the holder 119 and the coupled gear wheels 112 and 113 is interrupted after which the implement stops being driven. As in the preceding embodiments it is, of course, desirable to set the critical value of the power or torque to be transmitted to such a level that, if the implement is wholly or partly obstructed, it will not be damaged. In contrast to the preceding embodiments the bias tension of the spring 145 is responsible for the setting of the critical power or torque of all plungers 115 together.

Since the abutting member 126 is arranged near the tractor driver, he can control the bias tension of the spring 145, and hence the maximum power or torque at which the power take-off shaft 102 is automatically disconnected, by turning the set screw 130. On the outer side of the setting knob there is a dial 159 for indicating the horsepower or kilowatt rating at which disconnection occurs. By turning the setting knob so that a given, desired power value is opposite a setting line on the housing 127, the implement is automatically disconnected when this power is attained. The pin 148 has a slot in its outer end for receiving a screwdriver and may be used by the manufacturer as means for calibrating the setting of the adjusting member 126 or the setting knob 130 so that the dial 159 accurately corresponds to the value of the power or torque at which disconnection occurs. After loosening the nut 149 the pin 148 can be turned by a screw driver, the piston 147 being thus moved in the bore 146 so that the bias tension of the spring 145 can be adjusted. The diameter of the bore 140, which determines the fluid pressure on the ball 142, matches the overall fluid pressure produced by all plungers 115. If subsequent to disconnection of the overloaded implement the speed of the shaft 103 is reduced (for example, by switching off the driving engine or by disconnecting another coupling between the engine and the shaft 103), the fluid located beneath the seal 153 in the space 137 is pushed back through the bore 136 under the action of the spring 155. The ball 138 is thus lifted so that the fluid can flow back via the bore 134, the conduit 125 and the bores 122, 121, and 119 into the spaces 118 and the portions of the space 114 behind the plungers 115, the conical ends 116 of locking means being again ready for entering the recesses 13. Thus the shaft 103 is again rotated after which the implement is immediately re-actuated.

Figure 13:
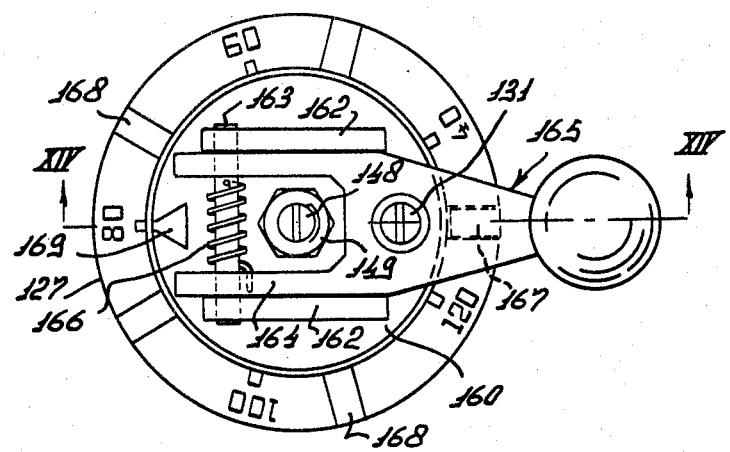
FIG. 13 is a plan view of an alternative construction for the embodiment of FIG. 12.
Figure 14:
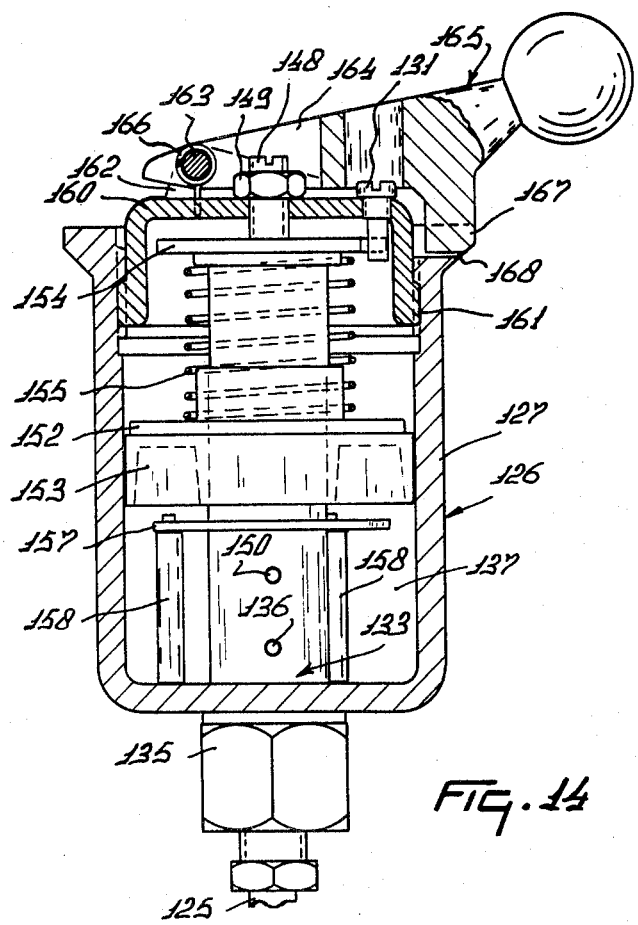
FIG. 14 is a sectional view taken on the lines XIV—XIV in FIG. 13.

An alternative embodiment of the adjusting member 126 disposed near the driver is illustrated in FIGS. 13 and 14. Parts corresponding with those of FIG. 12 are designated by the same reference numerals. The setting knob 130 surrounding the housing 127 by its rim with the dial 159 is replaced by a setting knob 160 having a U-shaped cross-section like that of the setting knob 130. The rim of the setting knob 160 of this embodiment is located inside the rim of the sleeve-like housing 127 and is provided with a screwthread 161 engaging a screwthread on the inner side of the housing 127. The setting knob 160 has again at the center a tapped hole receiving the calibration pin 148, which is locked in position by the nut 149. The outer side of the setting knob 160 is provided with two ears 162 at right angles to the top of the setting knob 160 and holding a pivotal shaft 163, which extends parallel to the top of the setting knob 160. About the pivotal shaft 163 are pivotable the relatively spaced, parallel limbs 164 of a handle 165 in a manner such that the screwdriver slot of the calibrated pin 148 is accessible between the two limbs 164.

The pivotal shaft 163 is rigidly secured with respect to the ears 162 and one end of a torsional spring 166 surrounding the pivotal shaft 163 is connected with one of the limbs 164 of the handle 165, whereas the other end of the spring 166 is rigidly secured to the shaft 163. The spring 166 exerts such a torque on the handle 165 that a lug 167 of the handle 165 is pressed into one of a plurality of recesses 168. When the lug 167 is located is a recess 168, a mark on the setting knob 160 indicates the corresponding value for the maximum power or torque to be transmitted. By turning the handle 165 and the resultant turning of the setting knob 160 via the pivotal shaft 163 and the ears 162 with the aid of the screwthread 161 various values of the maximum transmittable power can be obtained, while the setting knob 160 is displaced axially with respect to the housing 127 and the calibrated pin 148 produces a higher or lower bias tension of the spring 145 via the piston 147.

FIGS. 15 and 16 show a further embodiment suitable for use in the overload coupling shown in FIG. 11. The adjusting member shown in FIGS. 15 and 16 is not disposed near the tractor driver but near the plungers 115 inside the cover 105. Parts shown in FIGS. 15 and 16 corresponding with those of FIGS. 10 and 11 are designated by the same reference numerals. The shaft 103 has an axial bore 170 opening at the end of the shaft 103 away from the partition 104. The diameter of this axial bore 170 is about 60 to 70% of the diameter of the shaft 103 and the axial length of the bore is 2.5- to 3-times the diameter of the shaft 103. By means of a screwthread the bore 170 receives part of a holder 171, which is sealed at the outermost end face of the shaft 103 by a packing 172. The portion of the holder 171 disposed in the bore 170 has an uninterrupted annular groove 173 in the cylindrical outer circumference so that the bores 121 (which now have a smaller length than the bores 121 of FIG. 11) open into that groove 173. The groove 173 communicates through a radial bore 174 with an axial bore 175 extending away from the bore 174 in a direction away from the partition 104 towards the portion of the holder 171 projecting out of the shaft 103. The bore 175 meets a bore 176 which is coaxial with the bore 175 and has a diameter exceeding that of the bore 175. The bore 176 meets a bore 177 which has a diameter about twice that of the bore 176. The bore 177 has a screwthread near the neighbouring end face of the holder 171 for receiving a set screw 178, which closes the bore 177. The transitional area between the bores 175 and 176 is machined to a conical shape and, in normal operation, the conical end of a pin 179 closes that transitional area between the bores 176 and 177. The diameter of the pin 179 is smaller than the diameter of the surrounding wall of the bore 176. The pin 179 is fastened at its end remote from the bore 175 to a piston 180 having a packing sealing the piston with respect to the wall of the bore 177. Between the side of the piston 180 away from the pin 179 and the set screw 178 is a calibrated spring 181, the bias tension of which can be adjusted by means of the set screw 178. The parts 179, 180 and 181 form parts of an adjustable pressure relief valve.

Between the bores 176 and 177 a conical transitional area is formed, in practice, by the tip of the drill by which the bore 177 is made. The space in the bore 177 bounded by this transitional area directly communicates with the space around the pin 179 inside the bore 176, while on the side away from the pin 179 the conical space is closed by the piston 180. The holder 171 has furthermore an axial bore 182 opening at one end into the last-mentioned space enclosed in the transitional area of the bore 177 and at the other end in the end wall of the holder 171 away from the set screw 178 and hence in a chamber formed by the bore 170 near the holder 171. On the side away from the holder 171 this chamber is bounded by a piston 183 having a cup seal 184, the piston being movable with respect to the bore 170. Between the end face of the bore 170 away from the holder 171 and the piston 183 there is a comparatively slack helical spring 185 fastened to that end face and to the piston. The holder 171 has, in addition, an axial bore 186 opening out at the end face of the holder 171 facing the piston 183 and meeting a bore 187 which has a larger diameter then the bore 186 and is coaxial therewith. The transitional area between the bores 187 and 186 is closed by a ball 188, which is urged against the transitional area by a spring 189. The spring 189 bears, at its end remote from the ball 188, on a pin 190 fitting in the bore 187 so that the force applied by the spring 189 can be adjusted by axially displacing the pin 190 by means of a set screw 191. Finally a bore 192 establishes a communication between the bore 187, at a position directly behind the ball 188, and the groove 173.

As a result of the driving torque of an implement driven by means of the power take-off shaft 102 the conical ends or latching means 116 of the plungers 115 will again be loaded by force components directed parallel to the center lines of the plungers 115 and produced by forces exerted by the recesses or latching means 13 on the ends 116. Under these conditions hydraulic fluid is contained in the chambers 114 and 118 and in the bores 119, in the groove 120 and in the bores 121, in the groove 173 and in the bores 174 and 175. This incompressible fluid under pressure again behaves like a very rigid mass behind the plungers 115. If the implement is wholly or partially obstructed or overloaded, the torque transmitted between the gear wheel 113 and the holder 109 will increase shock-wise (also due to inertia forces of engine and flywheel and the like) so that the pressure of the fluid increases and the spring 181 is compressed by the force exerted by the fluid on the tip of the pin 179 located in the bore 175. The pin 179 thus moves towards the set screw 178 to open the pressure valve and the fluid flows around the pin 179 into the space located directly in front of the piston 180, from where it flows through the bore 182 into the chamber between the holder 171 and the sleeve 184. The pressure in that space thus increases so that the comparatively slack spring 185 is compressed. If subsequently the driver reduces the driving torque, the fluid pressure decreases so that the spring 185 urges the piston 183 towards the holder 171, the fluid thus lifting the ball 188 from its seat so that the fluid can flow back through the bore 187, the bore 192, the groove 173 and the bores 119 into the chambers 118 behind the plungers 115 so that at the lower speed the conical ends 116 can enter the recesses 13. By means of the set screw 178, which can be turned with a screw driver, the bias tension of the spring 181 can be adjusted; around the set screw powers or torques to be set are indicated.

Figure 17:
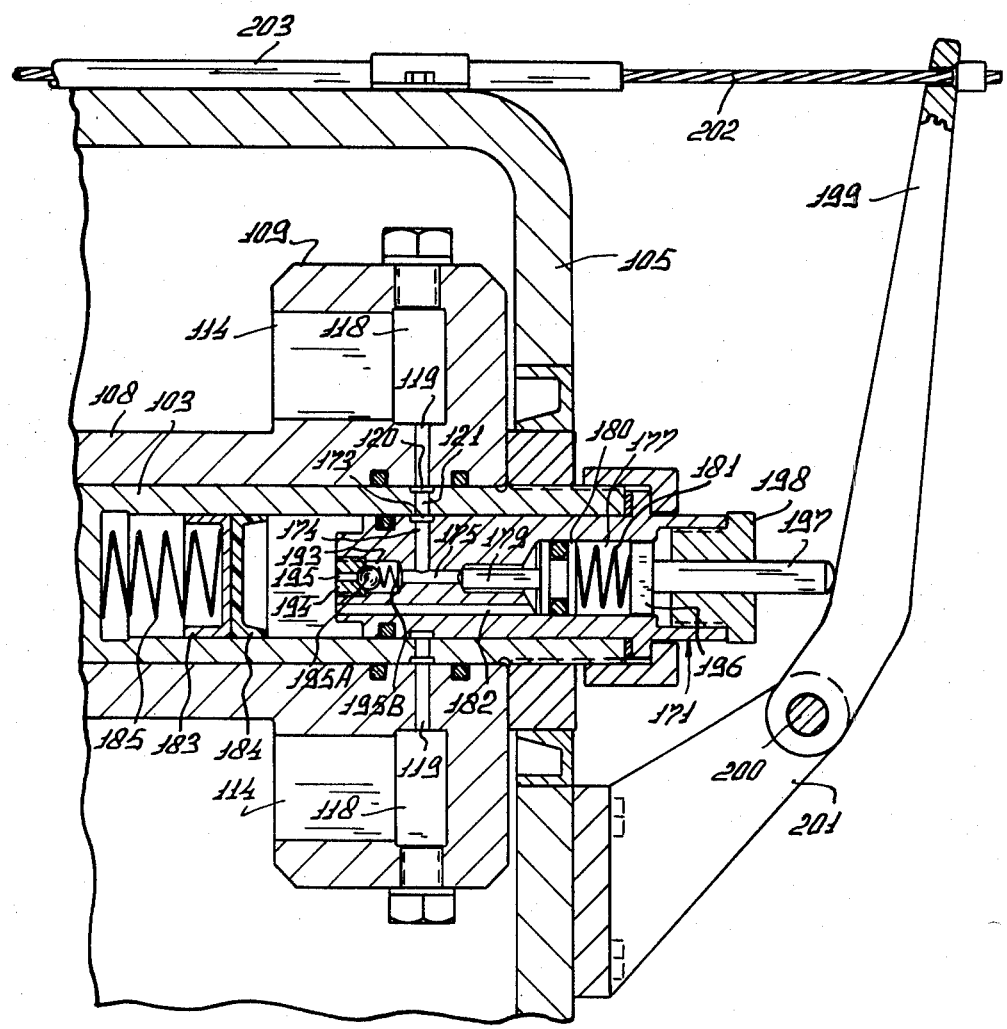
FIG. 17 shows an alternative construction for the embodiment shown in FIGS. 15 and 16.

The embodiment of the hydraulic part shown in FIGS. 17 to 19 is substantially similar to that of FIG. 15 except that the bore 175 is prolonged towards the piston 183 and, near the end face of the holder 171, meets a bore 193 having a larger diameter than the bore 175. Near the end face of the holder 171 the bore 193 has a plug 194 with a bore 195 which can establish a communication between the bore 193 and the chamber between the holder 171 and the sleeve 184. The bore 195 is closed in normal operation by a ball 195A, which is loaded by a spring 195B. The bores 186 and 187, the ball 188, the spring 189, the pin 190 and the set screw 191 as well as the bore 192 in the embodiment of FIG. 15 are lacking in the construction shown in FIG. 17. The flow of the pressurized fluid at the attainment of the maximum transmittable power or torque due to the relative displacement of the plungers 115 in the spaces 114 is performed in the same manner as in the embodiment of FIG. 15. However, when the speed has been reduced, the spring 185 pushes back the fluid by means of the piston 183 and the sleeve 184 via the bore 195, the ball 195A being lifted against the pressure of the spring 195B so that the fluid can flow back through the bore 193, the bore 175, the bore 174, the groove 173, the bores 121, the groove 120 and the bores 119 towards the chamber 118.

In the embodiment shown in FIG. 17 the set screw 178 is replaced by a piston 196 fitting in the bore 177 and caarying a pin 197, which is supported in a support 198 fastened to the holder 171 such that the piston 196 and the pin 197 can move axially with respect to the support 198. The end of the pin 197 projecting from the support 198 abuts a lever 199, which is fastened by a pivotal shaft 200 to a support 201, which is rigidly secured to the cover 105. The end of the lever 199 remote from the pivotal shaft 200 projects slightly out of or above the cover 105 and has at this place a hole holding the end of a steel cable 202. The steel cable 202 extends from the lever 199 along guides 203 to a position near the tractor driver, that end of the cable 202 being fastened to a rotatable setting knob 204 (FIGS. 18 and 19), which can be turned and, by means of a screwthread 205, be axially moved with respect to a pin 206. The pin 206 has an axial bore 207, the center line of which coincides with the center line of the cylindrical pin 206, and the cable 202 passes through this bore 207. The pin 206 is fastened to a support 208 which mounts the setting knob 204, for example, to the dashboard of the tractor. The support 208 has furthermore a tab 209 extending axially along the setting knob 204 and having a scale indicating the maximum transmittable power corresponding to the position of the setting knob 204 with respect to the pin 206. With this very simple remote-control of the adjustment of the overload coupling a turn of the knob 204 results in a displacement of that knob with respect to the pin 206 so that, depending on the sense of rotation, the bias tension of the spring 181 and hence the maximum transmittable power or torque can be adjusted via the Bowden cable 202 and the lever 199 and via the pin 197 and the piston 196. It is advantageous that the driver can control the maximum transmittable power or torque from his seat.

FIGS. 20 to 24 illustrate a construction in which the coupling is arranged in a change-speed gear box 210 provided in the interior of the driving mechanism of a tractor. Such gear boxes 210 serve to split up the driving force of the tractor engine on the one hand to drive the driven tractor wheels and on the other hand to drive one or more power take-off shafts. FIG. 20 shows the gear box 210 having an input shaft 211 driven by the tractor engine and two output shafts, that is to say, a driving shaft 212 for the tractor wheels and an output shaft 213 for driving one or more power take-off shafts. The essential parts of the construction of the gear box 210 will be discussed with reference to FIG. 21.

Figure 21:
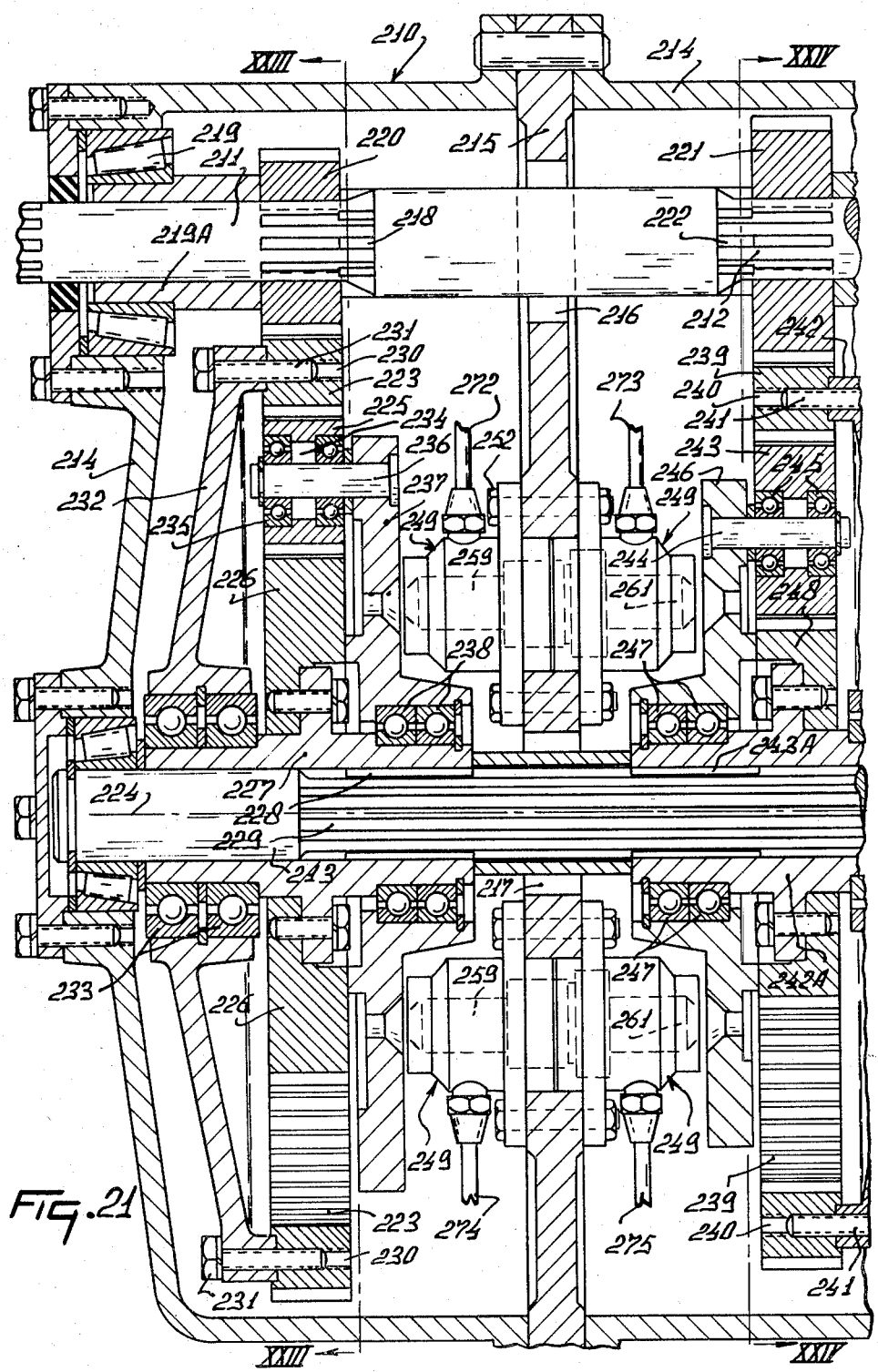
FIG. 21 is an enlarged sectional view of part of the construction shown in FIG. 20.

The gear box is fastened to the tractor and comprises a housing 214 consisting of symmetrical halves secured by bolts one to each side of a partition 215. The partition 215 has holes 216 and 217. The input shaft 211 and the output shaft 212 are integral with each other and are made from a single length of material; the central portion of the shaft 211, 212 is thicker than its two ends. The central portion extends through the hole 216. The shaft 211, 212 is disposed symmetrically to the partition 215 and near the two transitions from the thicker central portion to the thinner end portions axial splines 218, 222 are provided on the outer circumference of the shaft. The two ends of the shaft 211, 212 are supported in bearings, of which one bearing 219 is shown in FIG. 21; this bearing is supported in the housing 214. The inner ring of the bearing 219 bears on a spacer sleeve 219A, which fits closely around the end of the shaft 211, this sleeve determining the position of a pinion 220 mounted on the shaft 211, 212 by means of the splines 218. A pinion 221 is arranged symmetrically with the pinion 220 with respect to the partition 215 and is fixed for rotation with the shaft by the splines 222. It should be noted that the pitch of the pinion 221 is larger than that of the pinion 220. The pinion 220 meshes with a toothed crown 223, which is coaxial with the center line 224 of the shaft 213. The toothed crown 223 has external teeth which mesh with the teeth of the pinion 229 and also has inner teeth which mesh with a number of planet wheels 225, in this case five. The planet wheels 225 mesh with a central sun wheel 226, which is coaxial with the center line 224 and which is fastened to a sleeve 227 having internal axial splines 228. The splines 228 of the sleeve 227 engage splines 229 extending axially along the outer circumference of the shaft 213. Thus the sun wheel 226 is rotatably secured to the shaft 213.

The toothed crown 223 has a plurality of bores 230 receiving pins 231. The pins 231 are all supported in a circular or annular carrier 232, which is coaxial with the center line 224 and which is rotatably supported by means of bearings 233 on the sleeve 227.

Each of the planet wheels 225 has a central bore 234 accommodating bearings 235 by means of which the planet wheel 225 is rotatably supported on a shaft 236. The shafts 236 of the planet wheels 225 are all rigidly secured on a planet carrier 237, which is coaxial with the center line 224 and which is rotatably supported by means of bearings 238 on the sleeve 227. The carrier 232 is located on the side of the planetary gear wheel system 220, 223, 225, 226 away from the partition 215, whereas the planet carrier 237 is located on the side of the system nearer the partition 215.

In a similar manner the pinion 221 on the other side of the partition 215 is in mesh with external teeth of a toothed crown 239. The toothed crown 239 has a number of bores 240 receiving pins 241, which are supported in a carrier 242, which is rotatably mounted on a sleeve 242A, which is rotatably fixed by means of splines 243A to the splines 229 of the shaft 213. The toothed crown 239 also has internal teeth which mesh with a number of planet wheels 243, in this case five, each of which is rotatable about a shaft 244 by means of bearings 245. Each shaft 224 is fastened to a planet carrier 246, which is rotatable by means of bearings 247 with respect to the sleeve 242A. The planet wheels 243 mesh with a sun wheel 248, which is rotatably secured to the sleeve 242A and hence also to the shaft 213. The planet carrier 246 is disposed in the space between the partition 215 and the system 221, 239, 243, 248. The carrier 238 is located on the side of that system away from the partition 215.

Figure 23:
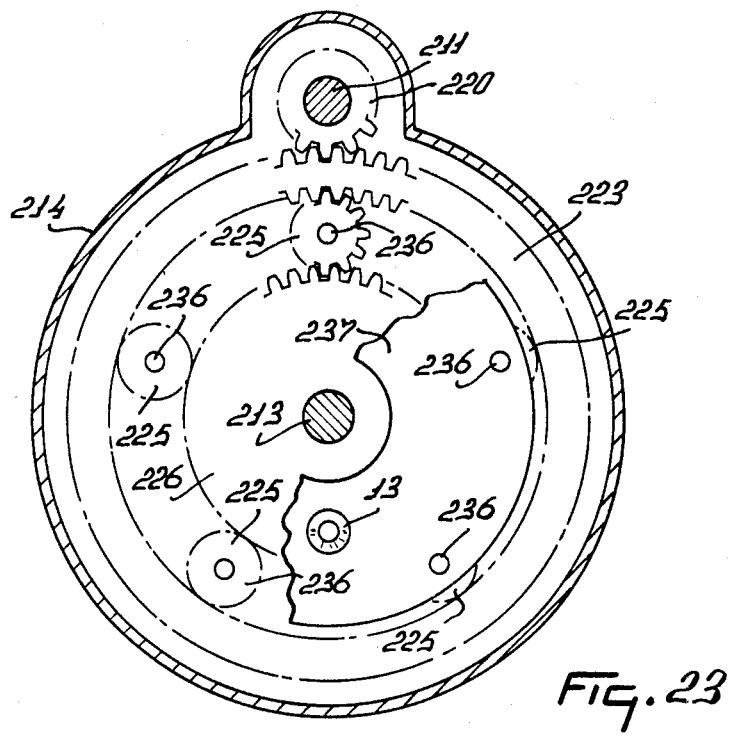
FIG. 23 is a schematic sectional view taken on the lines XXIII—XXIII in FIG. 21.
Figure 24:
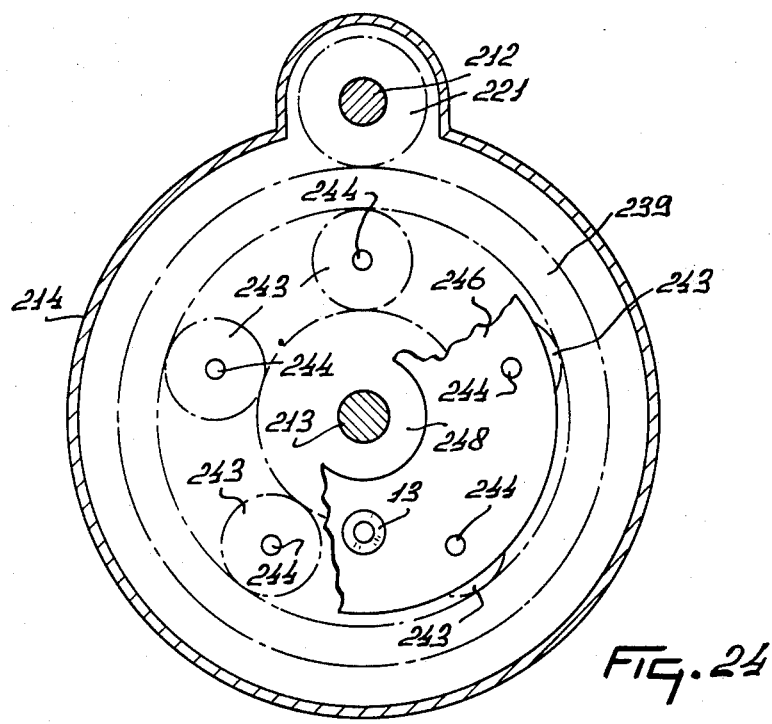
FIG. 24 is a schematic sectional view taken on the lines XXIV—XXIV in FIG. 21.

The two planetary gear wheel systems are illustrated in FIGS. 23 and 24 schematically in a simplified form. The ratio between the pitches of the gear wheel 220, the external teeth of the crown 223, the internal teeth of the crown 223, the planet wheels 225 and the sun wheel 226 is 30:180:150:25:100 so that when the planet carrier 237 is stationary the ratio between the speeds of the shaft 211 and of the shaft 213 is 4:1 (with an engine speed of about 2100 rev/min, the speed of the power take-off shaft would thus be 540 rev/min.). In the second planetary gear wheel system the said ratios are 42:170:140:35:70 so that the ratio between the speeds of the shaft 211, 212 and of the shaft 213 with the planet carrier 246 is stationary is 2:1 (an engine speed of about 2100 rev/min. giving a power take-off shaft speed of more than 1000 rev/min).

Figure 22:
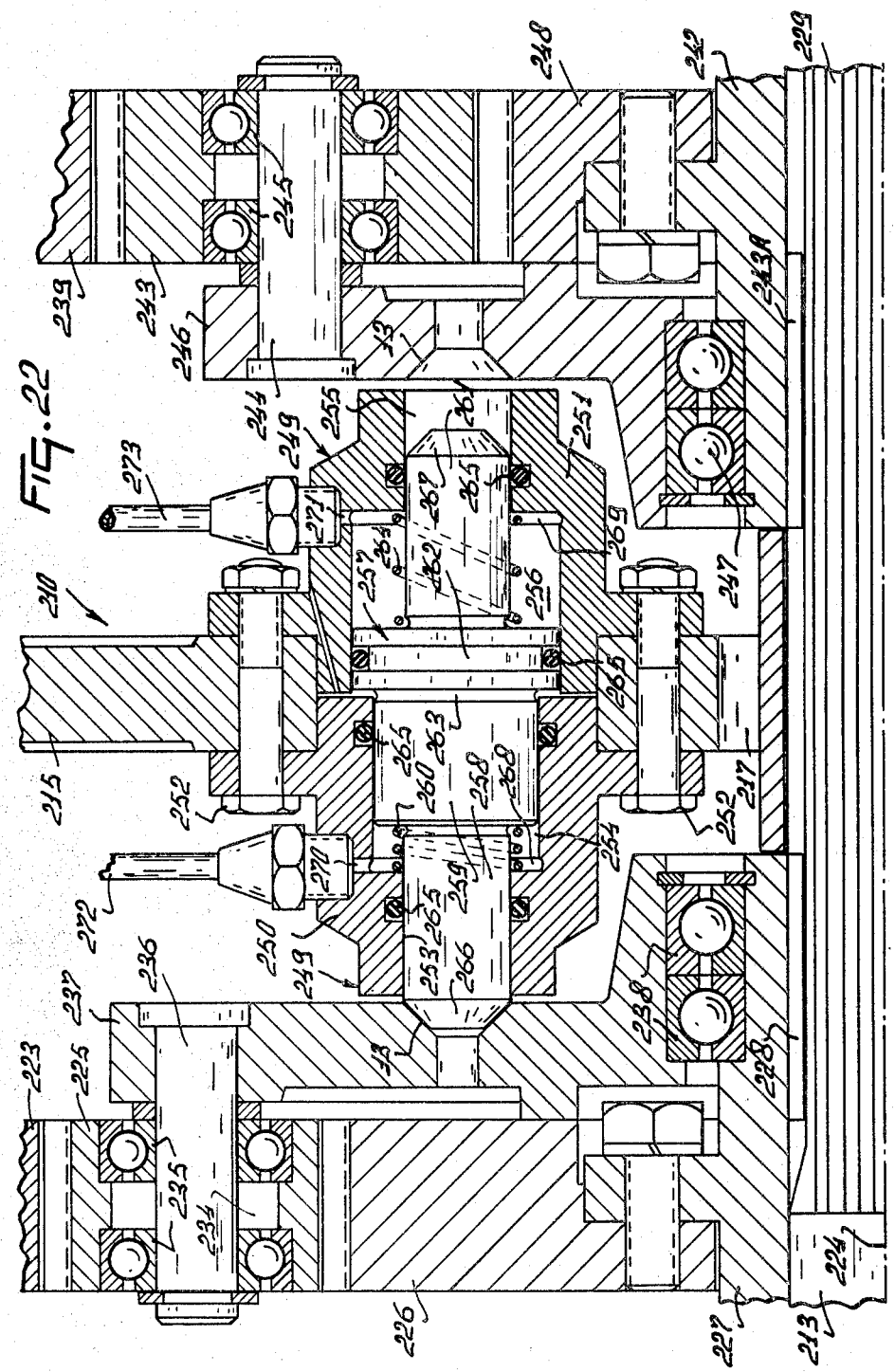
FIG. 22 is an enlarged sectional view of part of the section shown in FIG. 21.

The partition 215 has near the shaft 213 two diametrically opposite holes each of which holds a double-acting coupling member 249. Each of the two coupling members 249 has two holders 250, 251 arranged and shaped as is shown in FIG. 22. The holder 250 is located between the plane of symmetry of the partition 215 and the planet carrier 237, whereas the holder 251 is arranged between the same plane of symmetry and the planet carrier 246. The adjacent end faces of the holders 250 and 251 are short distance from one another and from the plane of symmetry of the partition 215. The two holders are rigidly secured to the partition 215 by bolts 252. The holder 50 has a bore 253 opening out in the end face of the holder 250 nearer the planet carrier 237 and opening, in a direction towards the plane of symmetry of the partition 215, into a bore 254 having a larger diameter than the bore 253 and opening out in the end face of the holder 250 nearer the plane of symmetry of the partition 215. The holder 251 has a bore 255 opening out in its end face nearer the planet carrier 246. This opens into a bore 256 having a larger diameter than the bore 255. The bore 256 opens out at the end face of the holder 251 nearer the plane of symmetry of the partition 215. The bores 253 to 256 are coaxial and perpendicular to the plane of symmetry of the partition 215 and are parallel to the center line 224 of the shaft 213. The diameters of the bores 253 and 255 are equal to one another and the diameter of the bore 256 is larger than that of the bore 254. The bores 253 to 256 receive a plunger unit 257 made from a single length of material. The plunger unit 257 has a cylindrical plunger portion 258 in the bore 253, the length of the portion 258 is greater than that of the bore 253. The cylindrical plunger portion 258 is connected to a cylindrical portion 259 fitting in the bore 254; the axial length of the portion 259 is smaller than that of the bore 254. Between the end face of the bore 254 and the end face of the portion 259 facing the portion 258 is arranged a comparatively slack spring 260, which closely surrounds the outer surface of the portion 258. In a similar manner the plunger unit 257 has a cylindrical plunger portion 261 fitting closely in the bore 255 and having a larger axial length than the bore 255. The cylindrical plunger portion 261 is connected to a cylindrical portion 262 fitting in the bore 256. The length of the cylindrical portion 262 is appreciably smaller than the axial length of the bore 256. Between the cylindrical portion 262 and the portion 259 there is a continuous groove 263. A spring 264 bears at one end on the end of the portion 262 facing the portion 261 and at the other end on the end face of the bore 256. The plunger unit 257 is sealed by packings 265 from the walls of the respective bores.

The cylindrical plunger portions 258 and 261 each have conical ends or latching means 266 and 267 respectively, which may project from the holders 250 and 251 respectively and which are formed like the conical end 32 in the first embodiment. The ends 266 and 267 can be located in corresponding recesses or latching means 13 in the planet carriers 237 and 246. The center lines of the conical recesses 13 coincide with the center line of the plunger unit 257.

Between the bores 253, 254 and 255, 256 respectively there are continuous grooves 268 and 269 respectively in the walls of the larger of each pair of bores. Bores 270 and 271 respectively extend parallel to the partition 215 and open out into these grooves. Conduits 272 and 273 are connected with the bores 270 and 271 respectively by means of nipples (FIG. 22). Each of the conduits 272 and 273 has a branch conduit 274 and 275 respectively (FIG. 20) connected with the bores 270 and 271 respectively in the other coupling member 249. The conduits 272, 274, 275 respectively are connected to conduits 276 and 277 respectively, both opening out in a distribution slide 278. By means of the distribution slide 278 one of the conduits 276 or 277 can be connected at will with a conduit 279 connecting the slide 278 with an adjusting member 280. The slide 278 is provided with a handle 281 provided with a pointer 282. The handle 281 can be put into any one of three positions, in one of which the conduit 279 communicates with the conduit 276, in another of which the conduit 279 communicates with the conduit 277, and in the third of which the passage between the conduit 279 and both of the conduits 276 and 277 on the other hand is interrupted.

The adjusting member 280 has a bore 283 communicating with the conduit 279. The bore 283 meets a bore 284 having a larger diameter than the bore 283. The bore 284 holds a ball 285 for blocking the communication between the bores 284 and 283. The ball 285 is loaded by a calibrated spring 286, whose end away from the ball 285 bears on a set screw 287, which is screwed into the bore 284 and is provided with a knob 288. By turning the knob 288 the tractor drive can adjust from his seat the bias tension of the spring 286. From the bore 283 extend two bores 289 and 290. The bore 289 communicates with a pressure gauge 291 for the hydraulic fluid. The bore 290 communicates through a conduit 292 with a bore 293 in a switching block 294. The bore 293 opens out into a bore 295 of the switching block 294, the diameter of this bore 295 exceeding that of the bore 243, and its center line being normal to that of the bore 293. On the other side of the bore 295 a bore 296 opens into the bore 293. The bores 293 and 296 are coaxial.

The bore 295 contains a plunger 297 projecting out of the switching block 294 and being provided there with a shoulder 298 serving as a push-button. Between the outer surface of the switching block 294 facing the shoulder 298 and the shoulder 298 itself is arranged a compression spring 299, which tends to push the plunger 297 outwardly of the switching block 294. This is prevented by a stop (not shown) which retains the plunger 297 in the position shown in FIG. 20. The plunger 297 has a radial bore 300, which interconnects the two bores 293 and 296 when the plunger 297 is completely depressed by the driver against the tension of the spring 299.

The bore 296 communicates with a conduit 301, which is connected with a hydraulic pump 302 drivable by the tractor engine and having its suction side connected with a fluid reservoir 303.

The adjusting member 280 has a bore 304 opening out into the bore 284 at a place between the ball 285 and the set screw 287. The bore 304 communicates with a conduit 305 opening into the reservoir 303.

In normal operation the shaft 211, 212 is driven by the tractor engine, for example, a diesel engine with a substantially constant speed of, say, about 2100 rev/min. If the planet carrier 237 is fixed during operation with respect of the housing 214, the output shaft 213 connected with the power take-off shaft is driven with a rotary speed of about 540 rev/min. In this case the planet carrier 246 is freely rotatable about the shaft 213 so that the planetary gear wheel system 221, 239, 243, 248 rotates loosely without transmitting torque. If conversely the planet carrier 246, instead of the planet carrier 237, is fixed with respect to the housing 214, the power or torque transferred by the shaft 211, 212 is transmitted by the planetary gear wheel system 221, 239, 243, 248 to the shaft 213 and hence to the power take-off shaft of the tractor. The other planetary system then rotates loosely without transmitting torque. If the planet carrier 246 is fixed with respect to the housing 214, the output speed of the shaft 213 is about 1000 rev/min at an engine speed of about 2100 rev/min.

One of the planet carriers 237 or 246 can be fixed with respect of the housing 214 as follows. The spaces, bores conduits 254, 268, 270, 272, 274, 276, 278, 279, 283, 289, 290, 273, 275 and 277 are completely filled in normal operation with incompressible hydraulic fluid, which is subjected to pressure by the transmitted torque. The conduit 301 and the bore 296 are filled with fluid pressuized during operation by the pump 302. The pump 302 is provided with a discharge valve (not shown) and a return conduit to the reservoir 303 so that fluid displaced by the pump 302 can flow back directly into the reservoir 303 when the fluid flow in the conduit 301 and in the bore 296 is blocked by the plunger 297. The bore 293 and the conduit 292 are constantly filled with hydraulic fluid. A ball 306 loaded by a spring 307 prevents the flow of fluid from the bore 290 towards the conduit 292.

During operation the distribution slide 278 is adjusted by means of the handle 281, for example, so that a communication is established between the conduits 279 and 276. When prior to the work the driver depresses the shoulder 298 and hence the plunger 297, the bore 296 is connected through the bore 300 with the bore 293. As a result the pressurised fluid in the conduit 301 flows through the conduit 292 into the bore 290 lifting the ball 306, and also into the conduit 289 so that the pump pressure can be read from the gauge 291. At the same time, the pressure of the fluid produced by the pump 302 is applied via the conduits 276, 272 and 274 on the fluid in the bore 254 (FIG. 22). As a result of this fluid pressure the cylindrical portion 259 is moved in a direction away from the planet carrier 237, and the cylindrical plunger portion 261 moves towards the planet carrier 246. An analogous displacement of the plunger 257 occurs, of course, in the other coupling member 249 (conduit 274). The fluid contained in the bore 256 is pushed back into the conduit 282 via the groove 269, the conduit 273 and 275 respectively, the conduit 277, the slide 278, the conduit 279, the bore 283, the bore 290, since the ball 306 is still lifted initially. This results in a transient increase in pressure in the system, which terminates as soon as the plunger 257 becomes stationary, when the pressure gauge 291 again indicates the pressure of the pump 302. The pressure on the plunger 297 is then released so that the plunger is moved by the spring 299 into the position shown in FIG. 20 so that the connections between the bores 293 and 296 are interrupted. In the meantime the conical ends 267 of the two plunger units 257 are urged into the recesses 13 in the planet carrier 246, whereas the conical ends 266 have completely left the planet carrier 237. The dimensions are such that, when the plunger unit 257 is in a central position determined by the spring 260 and 264, the two conical ends 266 and 267 are both located completely outside the planet carriers 237 and 246 so that in this central position the shaft 213 and hence the power take-off shaft are not driven at all.

When the ends 267 are located in the recesses 13 of the planet carrier 246, the latter is fixed with respect to the partition 215 and to the housing 214 and hence to the tractor frame so that the power supplied by the diesel engine is transmitted from the shaft 211, 212, through the planetary system 221, 239, 243, 248 to the shaft 213 so that the power take-off shaft connected therewith rotates with a speed of about 1000 rev/min. The coupling members 249 thus have a switching function for two speed of the power take-off shaft. If the implement connected with the power take-off shaft is wholly or partly obstructed or demands an undesirably high power or torque, the force exerted by the planet carrier 246 on the plunger unit 257 increases (this force being exerted by the recesses 13 on the ends 267). So far the fluid contained in the bore 254 and in the spaces communicating therewith behaved like a very rigid mass absorbing the forces between the recesses 13 and the ends 267 without distortion. However, if the critical value of the power or torque is attained, the fluid pressure in the space 254 and in the spaces communicating therewith exceeds a predetermined value dependent on the bias tension of the spring 286, which is previously adjusted by means of the set screw 287. When the critical value is exceeded the spring 286 (FIG. 20) is compressed and the fluid lifts the ball 285, the fluid thus flowing away through the bore 284, the bore 304 and the conduit 305 to the reservoir 303 when the ends 267 are pushed out of the recesses 13. These occurrences will, of course, be evident from the pressure gauge 291. The ball 285 and the spring 286 from parts of an adjustable pressure relief valve.

It should be noted that in normal operation the pressure of the fluid contained in the bore 254, which pressure can be read from the pressure gauge 291, is a measure of the power taken by the power take-off shaft. The dial of the pressure gauge 291 can therefore be calibrated in horsepower or kilowatts. The adjustment of the desired limitation of the power or torque to be taken by the power take-off shaft is also performed with reference to the values indicated by the pressure gauge 291 by turning the set screw 287.

The second function of the coupling members 249 consists in the automatic disconnection of an implement connected with the power take-off shaft, when the power required to operate the implement exceeds a predetermined power or torque.

When the handle 281 is put in the other position, communication is established between the conduits 279 and 277. After the depression of the plunger 297 the fluid pressure produced by the pump 302 is transmitted to the conduits 273 and 275 and hence to the bore 256 so that the cylindrical portion 258 and hence the latching means 266 are urged into the recesses 13 of the planet carrier 237, which is thus locked in place with respect of the housing 214. In this case the gear wheel system associated with the planet carrier 237 is operative so that the power or torque supplied by the Diesel engine to the shaft 211, 212 is transmitted to the shaft 213 and hence to the power take-off shaft with such a ratio that the power take-off shaft rotates with a speed of about 540 rev/min. The difference between the diameters of the bores 254 and 256 is a consequence of the different dimensions of the two gear wheel systems and it is such that the pressure gauge 291 indicates the same transmitted power or torque with both speeds of the power take-off shaft.

It is advantageous that the ends 266 and 267 are arranged in a non-rotating part. The speeds of the power take-off shaft (540 and 1000 rev/min.) can be readily adjusted by means of the handle 281. The horespower or kilowatt rating during normal operation by the power take-off shaft can be read from the pressure gauge 291.

In all of the preceding embodiments, the overload coupling automatically couples at a low speed, but this does not apply to the present embodiment since the plungers 257 as well as the planet carriers 237 and 246 are stationary prior to coupling and the plunger unit 257 is held in a medium position by means of the springs 260 and 264, in which case the power take-off shaft is not driven at all and the planet carriers are consequently not driven either.

Recapitulation it is noted that the power take-off shaft is driven with a speed of about 1000 rev/min by setting the handle 281 with a low speed of the driving engine. After the depression of the plunger 297 the ends 266 or 267 couple with one of the two planet carriers, the carrier being thus fixed to the housing 214. It is checked on the pressure gauge 291 whether the desired torque can be attained. If the meter indicates too low a value, the plunger 297 is again depressed so that the pump 302 again supplies pressurized fluid. If the pressure gauge 291 does not indicate any transmitted power or torque or if it indicates too high a power or torque, the desired value is adjusted by means of the knob 288. When the ends 266 or 267 are disconnected due to overload so that fluid escapes through the switching block 294, the cycle of operations is repeated.

It should be noted that the pressure gauge 291 is preferably of the type which does not indicate volume variations in the case of pressure variations. For this purpose an electric pressure gauge may be employed based on a piezo-electric effect.

The gear wheel arrangement in the box 210 is particularly suitable for use in a tractor having a power take-off shaft located beneath the differential gear of the tractor.

In the preceding embodiments recesses 13 and the corresponding conical ends invariably have a conical shape. However, other shapes of the recesses and the ends are also possible in all embodiments, such as are shown in FIGS. 25 to 28. These alternative latching means are shown in connection with the embodiment of FIGS. 20 to 24, but they may be employed, as stated above, also in the other embodiments. FIG. 25 shows that the cylindrical plunger portion 258 is provided with a latching means 308 having the shape of part of a spherical surface fitting in a recess or latching means 13 also having a spherical shape. Thus the power transmission during diconnection can vary so that the force between the two disconnecting parts gradually varies to zero so that shock loads are avoided. In the embodiment shown in FIG. 26 the cylindrical plunger portion 258 is provided with a ball 309, whose portion projecting from the holder 250 has the same shape as the end 308. The ball 309 is rigidly secured to the cylindrical plunger portion 258. The spherical recess 13 is provided with an insert 310. The insert 310 is fastened in a cavity in the portion to be coupled, in this case, in the planet carrier 237. Thus the properties of the material of the recesses 13 can be chosen independently of those of the parts to be coupled. In the embodiment shown in FIGS. 27 and 28 the cylindrical plunger portion 258 has a conical end 311 having the shape of a truncated pyramid. The end 311 fits in a recess 13 in an insert 312. The recess 13 has, of course, also the shape of a truncated pyramid matching the end 311. In order to avoid turning of the portion 258 and hence of the end 311 with respect to the holder 250, the holder 250 has an axial key way 313 fitting in a groove in the portion 259. The coupling members 249 are exchangeable.

All embodiments may, of course, also be employed in a drive by a stationary engine.

It should be noted that in all embodiments the device does not give rise to the development of heat subsequent to discoupling.

While varous features of the coupling that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A tractor comprising a frame and driving means connected to a driven shaft having an overload coupling, said coupling, having a part that operatively disconnects from said shaft upon torque overload, said tractor having a driver station and a signalling device that indicates overload occurrence positioned to be discernible from the station, said signalling device comprising a pressure gauge in communication with said part, said gauge and coupling being in hydraulic communication with a space that has a constant volume during normal operation, the hydrostatic pressure in said space being dependent on the torque, said shaft being an input shaft directly driven by the driving means, an output shaft being engaged by said overload coupling and said gauge indicating torque transmitted by the output shaft, at one speed of said driving means, the output shaft having a first rotary speed and a second rotary speed that is substantially higher, the hydrostatic pressure in said coupling being approximately the same at both speeds and said gauge indicating the torque at each speed.

2. A tractor as claimed in claim 1, wherein said driving means includes a set of gears for each speed of the output shaft, said overload coupling comprising plunger means having two different diameters and said plunger means interconnecting the input shaft to either of two different sets of gears to rotate said output shaft at different speeds.

3. A tractor as claimed in claim 2, wherein the hydrostatic pressure in the space is controlled by a pressure relief valve and said valve is in communication with a bore that contains the plunger means, said valve being adjustable from a position adjacent the driver station to establish the maximum torque transmitted by said coupling.

4. A tractor as claimed in claim 3, wherein said pressure relief valve is slideably mounted in a housing and biased by spring means, said spring means being adjustable and said device being in communication with the housing.

5. A tractor as claimed in claim 4, wherein each gear set has a respective carrier with a recess and co-acting plungers in a common holder engage either of two carriers, each plunger having a bevelled end that can be forced out of its respective recess upon overload.

6. A tractor as claimed in claim 5, wherein a preselected speed of rotation of the output shaft can be established by a switching member in the same hydraulic circuit with said signallying device, said member being a valve that opens and closes the flow of pressurized fluid produced by a hydraulic pump in said circuit.

7. A tractor as claimed in claim 6, wherein said coacting plungers are moved to a neutral position upon overload in which position the gear sets are disengaged from driving the output shaft.

8. A tractor as claimed in claim 7, wherein said coupling is connected to a universal joint.

9. A tractor as claimed in claim 11, wherein said gauge is based on piezo-electric effects and maintains a constant volume.

10. A transmission device comprising driving means connected to a driven shaft having an overload coupling, said coupling having a part that operatively disconnects from said shaft upon torque overload, said device having discernible signal means comprising a gauge that indicates overload occurrence being in communication with said part, said gauge and coupling being in hydraulic communication with a space that has a constant volume during normal operation, the hydrostatic pressure in said space being dependent on the torque, said shaft being input shaft means directly driven by the driving means, output shaft means being engaged by said overload coupling and said gauge indicating torque transmitted by the output shaft means at one speed of said driving means, said output shaft means having a first rotary speed and a second rotary speed that is substantially higher, the hydrostatic pressure in said coupling being approximately the same at both speeds and said gauge indicating the torque at each speed.

11. A tractor as claimed in claim 10, wherein, at one speed of the driving means, the output shaft has a first rotary speed and a second rotary speed that is substantially higher, the hydrostatic pressure in said coupling being approximately the same at both speeds and said gauge indicating the torque at each speed.

12. A tractor as claimed in claim 10, wherein said gauge is based on piezo-electric effects and maintains a constant volume.

13. A transmission device comprising driving means connected to an output through an overload coupling, said coupling having a displaceable part that operatively disconnects from said driving means upon torque overload, said coupling being in hydraulic communication with a space that has a constant volume during normal operation, said driving means including at least two sets of gears and either of said sets being engaged to drive said output at a respective speed, the hydrostatic pressure in said space being the same at either speed and dependent upon the torque on said gears, said part being displaced by excessive torque at either speed to disconnect said coupling.

* * * * *